US011350298B2

(12) United States Patent
Lewis et al.

(10) Patent No.: US 11,350,298 B2
(45) Date of Patent: May 31, 2022

(54) METHOD AND SYSTEM FOR IMPLEMENTING TELECOMMUNICATIONS EQUIPMENT HEALTH MONITORING AND MANAGEMENT

(71) Applicant: CenturyLink Intellectual Property LLC, Broomfield, CO (US)

(72) Inventors: Ronald A. Lewis, Monroe, LA (US); Mark B. Nielsen, Littleton, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 158 days.

(21) Appl. No.: 16/449,185

(22) Filed: Jun. 21, 2019

(65) Prior Publication Data

US 2020/0344626 A1    Oct. 29, 2020

Related U.S. Application Data

(60) Provisional application No. 62/837,622, filed on Apr. 23, 2019.

(51) Int. Cl.
*H04W 24/10* (2009.01)
*H04L 67/12* (2022.01)
(Continued)

(52) U.S. Cl.
CPC ........... *H04W 24/10* (2013.01); *H04L 43/045* (2013.01); *H04L 43/065* (2013.01);
(Continued)

(58) Field of Classification Search
CPC .... H04W 24/10; H04W 24/04; H04L 43/045; H04L 43/065; H04L 43/0817; H04L 67/12; H04L 43/12
See application file for complete search history.

(56) References Cited

U.S. PATENT DOCUMENTS 6,067,030 A * 5/2000 Burnett .................. H04L 43/00
340/637
8,675,500 B2 * 3/2014 Marshall ............... H04L 41/507
370/242
(Continued)

*Primary Examiner* — Thomas J Dailey
*Assistant Examiner* — Aye M Aung

(57) ABSTRACT

Novel tools and techniques are provided for implementing telecommunications equipment health monitoring and management. In various embodiments, a computing system might receive, from a monitoring sensor(s), one or more characteristics of each of at least one of telecommunications equipment, telecommunications equipment batteries, or battery strings, in some cases via a network maintenance tunnel. The computing system might analyze the monitored one or more characteristics to identify each telecommunications equipment, each telecommunications equipment battery, or each battery string having equipment health issues. Based on a determination that one or more of at least one telecommunications equipment, at least one telecommunications equipment battery, or at least one battery string have equipment health issues, the computing system might send a notification to a user(s), the notification comprising information regarding the at least one telecommunications equipment, the at least one telecommunications equipment battery, and/or the at least one battery string having equipment health issues.

14 Claims, 9 Drawing Sheets

(51) Int. Cl.
*H04W 24/04* (2009.01)
*H04L 43/065* (2022.01)
*H04L 43/0817* (2022.01)
*H04L 43/045* (2022.01)
*H04L 43/12* (2022.01)

(52) U.S. Cl.
CPC .......... *H04L 43/0817* (2013.01); *H04L 67/12* (2013.01); *H04W 24/04* (2013.01); *H04L 43/12* (2013.01)

(56) References Cited

U.S. PATENT DOCUMENTS

| | | | |
|---|---|---|---|
| 9,262,255 B2* | 2/2016 | Hampapur | G06N 7/005 |
| 2004/0178770 A1* | 9/2004 | Gagnon | H02J 7/0048 |
| | | | 320/132 |
| 2009/0247222 A1* | 10/2009 | Bonnat | G06F 3/04886 |
| | | | 455/557 |
| 2013/0332603 A1* | 12/2013 | Hutten | H04L 67/12 |
| | | | 709/224 |
| 2015/0067153 A1* | 3/2015 | Bhattacharyya | H04L 43/04 |
| | | | 709/224 |

* cited by examiner

US 11,350,298 B2

METHOD AND SYSTEM FOR IMPLEMENTING TELECOMMUNICATIONS EQUIPMENT HEALTH MONITORING AND MANAGEMENT

CROSS-REFERENCES TO RELATED APPLICATIONS

This application claims priority to U.S. Patent Application Ser. No. 62/837,622 (the "'622 application"), filed Apr. 23, 2019 by Ronald A. Lewis et al., entitled, "Method and System for Implementing Telecommunications Equipment Health Monitoring and Management," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing communications with telecommunications equipment, and, more particularly, to methods, systems, and apparatuses for implementing telecommunications equipment health monitoring and management.

BACKGROUND

In conventional telecommunications systems, typical battery circuits that provide power to digital subscriber line access multiplexer ("DSLAM") cabinets or other remote facilities during power outages to ensure that customers can continue to receive network service during temporary outages. However, such typical battery circuits or conventional telecommunications systems lack the means to monitor battery health or battery life (or equipment health or life). Conventional solutions that do exist are generally more expensive than replacing the battery. When a battery dies, the only way a service provider would know that the battery has died is if there is an outage and a large number of subscribers lose service, and if the service provider can ascribe the larger outage to a power loss at the DSLAM. The service provider might end up having to roll up a large number of trucks to find out it is a battery issue. But, the service provider loses visibility to the bad battery because, once power is restored, the service provider closes out the tickets.

Hence, there is a need for more robust and scalable solutions for implementing communications with telecommunications equipment, and, more particularly, to methods, systems, and apparatuses for implementing telecommunications equipment health monitoring and management.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1A:
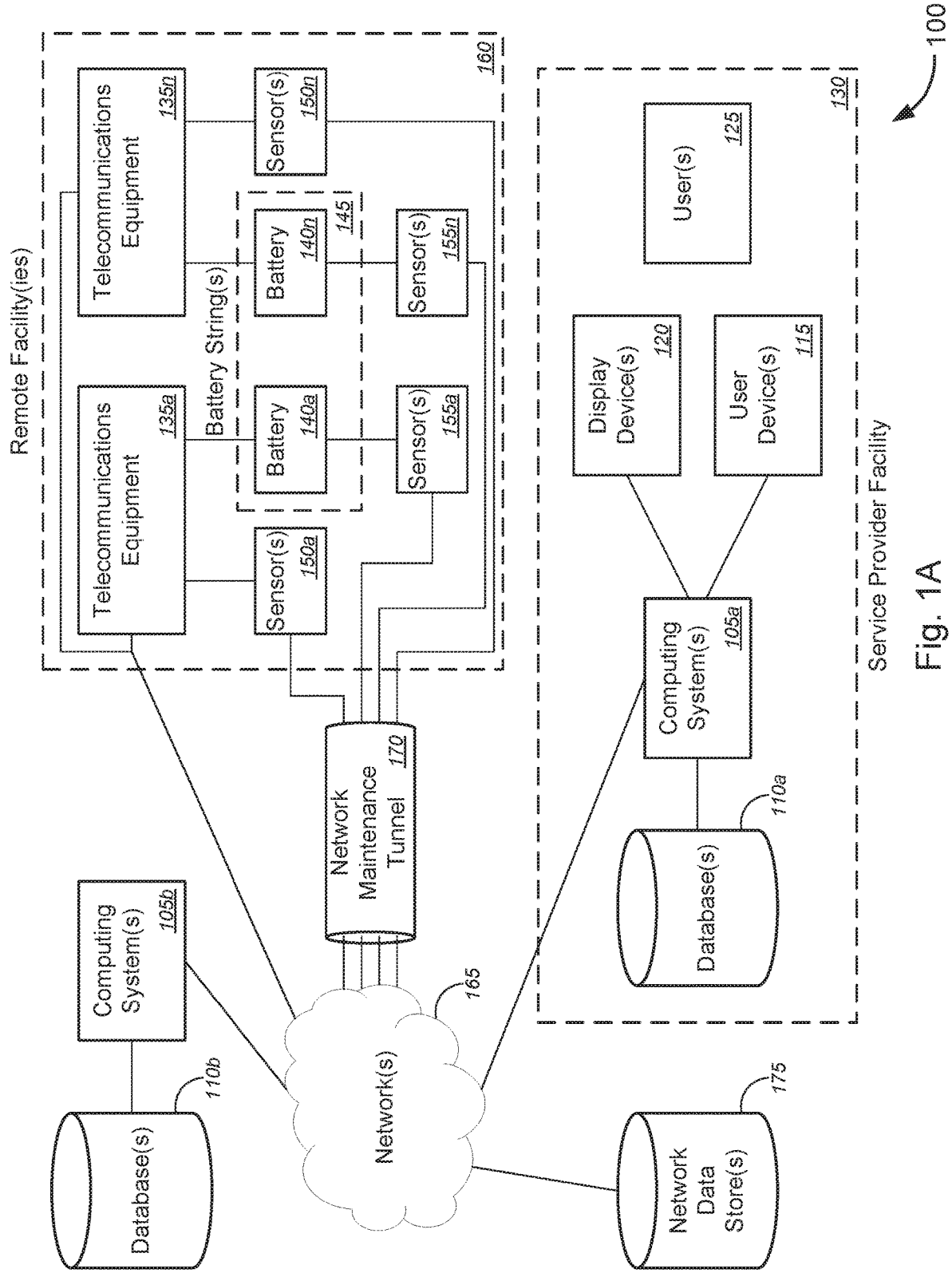
FIG. 1A is a schematic diagram illustrating a system for implementing telecommunications equipment health monitoring and management, in accordance with various embodiments.

Various embodiments provide tools and techniques for implementing communications with telecommunications equipment, and, more particularly, to methods, systems, and apparatuses for implementing telecommunications equipment health monitoring and management.

In various embodiments, at least one sensor might monitor one or more characteristics of each of at least one of one or more telecommunications equipment in a remote facility (e.g., a central office, a remote cabinet, or a digital subscriber line access multiplexer ("DSLAM"), and/or the like), one or more telecommunications equipment batteries within a battery string providing power to telecommunications equipment in a remote facility, or one or more battery strings providing power to telecommunications equipment in a remote facility, and/or the like. The at least one sensor might send the monitored one or more characteristics of each of the at least one of the one or more telecommunications equipment, the one or more telecommunications equipment batteries, or the one or more battery strings, via a network maintenance tunnel, in some cases to a network data store(s). A computing system(s) might subsequently receive the monitored one or more characteristics of each of the at least one of the one or more telecommunications equipment, the one or more telecommunications equipment batteries, or the one or more battery strings, in some cases from the network data store(s), over the network(s) (in some instances, via the network maintenance tunnel).

Computing system(s) might analyze the monitored one or more characteristics of each of the at least one of the one or more telecommunications equipment, the one or more telecommunications equipment batteries, or the one or more battery strings to identify each telecommunications equipment, each telecommunications equipment battery, or each battery string having equipment health issues. Based on a determination that one or more of at least one telecommunications equipment, at least one telecommunications equipment battery, or at least one battery string have equipment health issues, the computing system(s) might send a notification to user(s) (e.g., by sending the notification to user device(s), or the like), the notification comprising information regarding the one or more of the at least one telecommunications equipment, the at least one telecommunications equipment battery, or the at least one battery string having equipment health issues, and/or the like.

In some cases, the one or more characteristics of each of the at least one of the one or more telecommunications equipment, the one or more telecommunications equipment batteries, or the one or more battery strings might include, without limitation, at least one of voltage, amperage, electrical charge, temperature, humidity, gas discharge, network connectivity, or network communications characteristics, and/or the like. In some instances, the equipment health issues might include, but are not limited to, at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues, and/or the like.

According to some embodiments, the computing system(s) might generate a graphical visualization that presents at least one of the monitored one or more characteristics of each of the at least one of the one or more telecommunications equipment, the one or more telecommunications equipment batteries, or the one or more battery strings or analytics summarizing the monitored one or more characteristics of each of the at least one of the one or more telecommunications equipment, the one or more telecommunications equipment batteries, or the one or more battery strings, and/or the like. The computing system(s) might subsequently display, on a display device that is viewable by the user(s), the generated graphical visualization.

The various embodiments address issues with conventional telecommunications systems or typical battery circuits used in said conventional telecommunications systems. Rather, the various embodiments provide a plurality of sensors that monitor at least one of one or more telecommunications equipment, one or more batteries providing power to the one or more telecommunications equipment, and/or one or more battery strings providing power to the one or more telecommunications equipment, and/or the like that are disposed in a remote facility (e.g., a central office, a remote cabinet, or a digital subscriber line access multiplexer ("DSLAM"), and/or the like). The plurality of sensors might subsequently send characteristics of the monitored at least one of the one or more telecommunications equipment, the one or more telecommunications equipment batteries, or the one or more battery strings, and/or the like, to a computing system (and/or a network data store(s) (e.g., an analytics-based data store such as Splunk®, Tableau®, or the like), etc.) over a network, via network maintenance tunnel (e.g., a generic routing encapsulation ("GRE") tunnel, a business support systems ("BSS") communications line, an operations support systems ("OSS") communications line, or a virtual private network ("VPN") communications connection, and/or the like). The computing system(s) might analyze the monitored characteristics of the at least one of the one or more telecommunications equipment, the one or more telecommunications equipment batteries, or the one or more battery strings, and/or the like, and might generate a graphical visualization that presents the monitored characteristics and/or analytics summarizing the monitored characteristics, and might display the generated graphical visualization. In this manner, the various embodiments provide monitoring of the health or life of telecommunications equipment, batteries, and/or battery strings that are disposed in the remote facility, regardless of whether the issues have been resolved, and without any truck rolls being required to perform the monitoring.

These and other aspects of the telecommunications equipment health monitoring and management method and system are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, telecommunications equipment monitoring technology, telecommunications equipment management technology, and/or the like. In other aspects, certain embodiments, can improve the functioning of user equipment or systems themselves (e.g., telecommunications equipment monitoring and management system, etc.), for example, by monitoring, with at least one sensor of a telecommunications equipment health monitoring and management system, one or more characteristics of each of at least one of one or more telecommunications equipment in a central office, a remote cabinet, or a digital subscriber line access multiplexer ("DSLAM"), one or more telecommunications equipment batteries within a battery string providing power to telecommunications equipment in a central office, a remote cabinet, or a DSLAM, or one or more battery strings providing power to telecommunications equipment in a central office, a remote cabinet, or a DSLAM; sending, with the at least one sensor of the telecommunications equipment health monitoring and management system and via a network maintenance tunnel and over a network, the monitored one or more characteristics of each of the at least one of the one or more telecommunications equipment, the one or more telecommunications equipment batteries, or the one or more battery strings; receiving, with a computing system of the telecommunications equipment health monitoring and management system, the monitored one or more characteristics of each of the at least one of the one or more telecommunications equipment, the one or more telecommunications equipment batteries, or the one or more battery strings; analyzing, with the computing system of the telecommunications equipment health monitoring and management system, the monitored one or more characteristics of each of the at least one of the one or more telecommunications equipment, the one or more telecommunications equipment batteries, or the one or more battery strings to identify each telecommunications equipment, each telecommunications equipment battery, or each battery string having equipment health issues; and based on a determination that one or more of at least one telecommunications equipment, at least one telecommunications equipment battery, or at least one battery string have equipment health issues, sending, with the computing system, a notification to a user, the notification comprising information regarding the one or more of the at least one telecommunications equipment, the at least one telecommunications equipment battery, or the at least one battery string having equipment health issues; and/or the like.

In particular, to the extent any abstract concepts are present in the various embodiments, those concepts can be implemented as described herein by devices, software, systems, and methods that involve specific novel functionality (e.g., steps or operations), such as, in response to receiving, from at least one sensor, monitored one or more characteristics of each of the at least one of the one or more telecommunications equipment, the one or more telecommunications equipment batteries, or the one or more battery strings; analyzing, with the computing system of the telecommunications equipment health monitoring and management system, the monitored one or more characteristics of each of the at least one of the one or more telecommunications equipment, the one or more telecommunications equipment batteries, or the one or more battery strings to identify each telecommunications equipment, each telecommunications equipment battery, or each battery string having equipment health issues; and based on a determination that one or more of at least one telecommunications equipment, at least one telecommunications equipment battery, or at least one battery string have equipment health issues, sending, with the computing system, a notification to a user, the notification comprising information regarding the one or more of the at least one telecommunications equipment, the at least one telecommunications equipment battery, or the at least one battery string having equipment health issues; and/or the like, to name a few examples, that extend beyond mere conventional computer processing operations. These functionalities can produce tangible results outside of the implementing computer system, including, merely by way of example, optimized monitoring and management of telecommunications equipment, batteries, and/or battery strings that are disposed at a remote facility, and/or the like, at least some of which may be observed or measured by customers and/or service providers.

In an aspect, a method might comprise monitoring, with at least one sensor of a telecommunications equipment health monitoring and management system, one or more characteristics of each of at least one of one or more telecommunications equipment in a central office, a remote cabinet, or a digital subscriber line access multiplexer ("DSLAM"), one or more telecommunications equipment batteries within a battery string providing power to telecommunications equipment in a central office, a remote cabinet, or a DSLAM, or one or more battery strings providing power to telecommunications equipment in a central office, a remote cabinet, or a DSLAM; and sending, with the at least one sensor of the telecommunications equipment health monitoring and management system and via a network maintenance tunnel and over a network, the monitored one or more characteristics of each of the at least one of the one or more telecommunications equipment, the one or more telecommunications equipment batteries, or the one or more battery strings. The method might further comprise receiving, with a computing system of the telecommunications equipment health monitoring and management system, the monitored one or more characteristics of each of the at least one of the one or more telecommunications equipment, the one or more telecommunications equipment batteries, or the one or more battery strings; and analyzing, with the computing system of the telecommunications equipment health monitoring and management system, the monitored one or more characteristics of each of the at least one of the one or more telecommunications equipment, the one or more telecommunications equipment batteries, or the one or more battery strings to identify each telecommunications equipment, each telecommunications equipment battery, or each battery string having equipment health issues. The method might comprise, based on a determination that one or more of at least one telecommunications equipment, at least one telecommunications equipment battery, or at least one battery string have equipment health issues, sending, with the computing system, a notification to a user, the notification comprising information regarding the one or more of the at least one telecommunications equipment, the at least one telecommunications equipment battery, or the at least one battery string having equipment health issues.

In some embodiments, the at least one sensor might be coupled to each equipment, battery, or battery string among the at least one of the one or more telecommunications equipment, the one or more telecommunications equipment batteries, or the one or more battery strings, and/or the like. In some cases, the at least one sensor might each comprise at least one of a voltmeter, an ammeter, a multimeter, a thermometer, a humidity sensor, a gas discharge sensor, network connectivity sensor, or network communications sensor, and/or the like. According to some embodiment, the one or more characteristics of each of the at least one of the one or more telecommunications equipment, the one or more telecommunications equipment batteries, or the one or more battery strings, and/or the like, might comprise at least one of voltage, amperage, electrical charge, temperature, humidity, gas discharge, network connectivity, or network communications characteristics, and/or the like. In some instances, the equipment health issues comprise at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues, and/or the like.

According to some embodiments, the network maintenance tunnel might comprise one of a generic routing encapsulation ("GRE") tunnel, a business support systems ("BSS") communications line, an operations support systems ("OSS") communications line, or a virtual private network ("VPN") communications connection, and/or the like. In some cases, the network maintenance tunnel might be a communications tunnel that transfers data over the network without utilizing bandwidth associated with customers of a service provider operating the network.

In some embodiments, sending the monitored one or more characteristics of each of the at least one of the one or more telecommunications equipment, the one or more telecommunications equipment batteries, or the one or more battery strings via the network maintenance tunnel and over the network might comprise sending, with the at least one sensor of the telecommunications equipment health monitoring and management system and to a network data store via the network maintenance tunnel and over the network, the monitored one or more characteristics of each of the at least one of the one or more telecommunications equipment, the one or more telecommunications equipment batteries, or the one or more battery strings, and/or the like. In such embodiments, receiving, with the computing system of the telecommunications equipment health monitoring and management system, the monitored one or more characteristics of each of the at least one of the one or more telecommunications equipment, the one or more telecommunications equipment batteries, or the one or more battery strings might comprise receiving, with the computing system of the telecommunications equipment health monitoring and management system and from the network data store, the monitored one or more characteristics of each of the at least one of the one or more telecommunications equipment, the one or more telecommunications equipment batteries, or the one or more battery strings, and/or the like.

According to some embodiments, the method might further comprise generating, with the computing system of the telecommunications equipment health monitoring and management system, a graphical visualization that presents at least one of the monitored one or more characteristics of each of the at least one of the one or more telecommunications equipment, the one or more telecommunications equipment batteries, or the one or more battery strings or analytics summarizing the monitored one or more characteristics of each of the at least one of the one or more telecommunications equipment, the one or more telecommunications equipment batteries, or the one or more battery strings; and displaying, with the computing system and on a display device that is viewable by the user, the generated graphical visualization.

In another aspect, a telecommunications equipment health monitoring and management system might comprise at least one sensor disposed at one of a central office, a remote cabinet, or a digital subscriber line access multiplexer ("DSLAM"), and/or the like, and a computing system that communicatively couples to the at least one sensor via a network maintenance tunnel and over a network.

The at least one sensor might monitor one or more characteristics of each of at least one of one or more telecommunications equipment in the one of the central office, the remote cabinet, or the DSLAM, one or more telecommunications equipment batteries within a battery string providing power to telecommunications equipment in the one of the central office, the remote cabinet, or the DSLAM, or one or more battery strings providing power to telecommunications equipment in the one of the central office, the remote cabinet, or the DSLAM, wherein the at least one sensor might send the monitored one or more characteristics of each of the at least one of the one or more telecommunications equipment, the one or more telecommunications equipment batteries, or the one or more battery strings via a network maintenance tunnel and over a network.

The computing system might comprise at least one processor and a non-transitory computer readable medium communicatively coupled to the at least one processor. The non-transitory computer readable medium might have stored thereon computer software comprising a set of instructions that, when executed by the at least one processor, causes the computing system to: receive the monitored one or more characteristics of each of the at least one of the one or more telecommunications equipment, the one or more telecommunications equipment batteries, or the one or more battery strings; analyze the monitored one or more characteristics of each of the at least one of the one or more telecommunications equipment, the one or more telecommunications equipment batteries, or the one or more battery strings to identify each telecommunications equipment, each telecommunications equipment battery, or each battery string having equipment health issues; and based on a determination that one or more of at least one telecommunications equipment, at least one telecommunications equipment battery, or at least one battery string have equipment health issues, send a notification to a user, the notification comprising information regarding the one or more of the at least one telecommunications equipment, the at least one telecommunications equipment battery, or the at least one battery string having equipment health issues.

In some embodiments, the at least one sensor might be coupled to each equipment, battery, or battery string among the at least one of the one or more telecommunications equipment, the one or more telecommunications equipment batteries, or the one or more battery strings, and/or the like. In some cases, the at least one sensor might each comprise at least one of a voltmeter, an ammeter, a multimeter, a thermometer, a humidity sensor, a gas discharge sensor, network connectivity sensor, or network communications sensor, and/or the like. According to some embodiments, the one or more characteristics of each of the at least one of the one or more telecommunications equipment, the one or more telecommunications equipment batteries, or the one or more battery strings might comprise at least one of voltage, amperage, electrical charge, temperature, humidity, gas discharge, network connectivity, or network communications characteristics, and/or the like. In some instances, the equipment health issues might comprise at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues, and/or the like.

According to some embodiments, the network maintenance tunnel might comprise one of a generic routing encapsulation ("GRE") tunnel, a business support systems ("BSS") communications line, an operations support systems ("OSS") communications line, or a virtual private network ("VPN") communications connection, and/or the like. In some cases, the network maintenance tunnel might be a communications tunnel that transfers data over the network without utilizing bandwidth associated with customers of a service provider operating the network.

In some embodiments, sending the monitored one or more characteristics of each of the at least one of the one or more telecommunications equipment, the one or more telecommunications equipment batteries, or the one or more battery strings via the network maintenance tunnel and over the network might comprise sending, with the at least one sensor of the telecommunications equipment health monitoring and management system and to a network data store via the network maintenance tunnel and over the network, the monitored one or more characteristics of each of the at least one of the one or more telecommunications equipment, the one or more telecommunications equipment batteries, or the one or more battery strings, and/or the like. In such embodiments, receiving the monitored one or more characteristics of each of the at least one of the one or more telecommunications equipment, the one or more telecommunications equipment batteries, or the one or more battery strings might comprise receiving, with the computing system of the telecommunications equipment health monitoring and management system and from the network data store via the network maintenance tunnel and over the network, the monitored one or more characteristics of each of the at least one of the one or more telecommunications equipment, the one or more telecommunications equipment batteries, or the one or more battery strings, and/or the like.

According to some embodiments, the set of instructions, when executed by the at least one processor, might further cause the computing system to: generate a graphical visualization that presents at least one of the monitored one or more characteristics of each of the at least one of the one or more telecommunications equipment, the one or more telecommunications equipment batteries, or the one or more battery strings or analytics summarizing the monitored one or more characteristics of each of the at least one of the one or more telecommunications equipment, the one or more telecommunications equipment batteries, or the one or more battery strings; and display, on a display device that is viewable by the user, the generated graphical visualization.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing communications with telecommunications equipment, and, more particularly, to methods, systems, and apparatuses for implementing telecommunications equipment health monitoring and management, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Figure 1B:
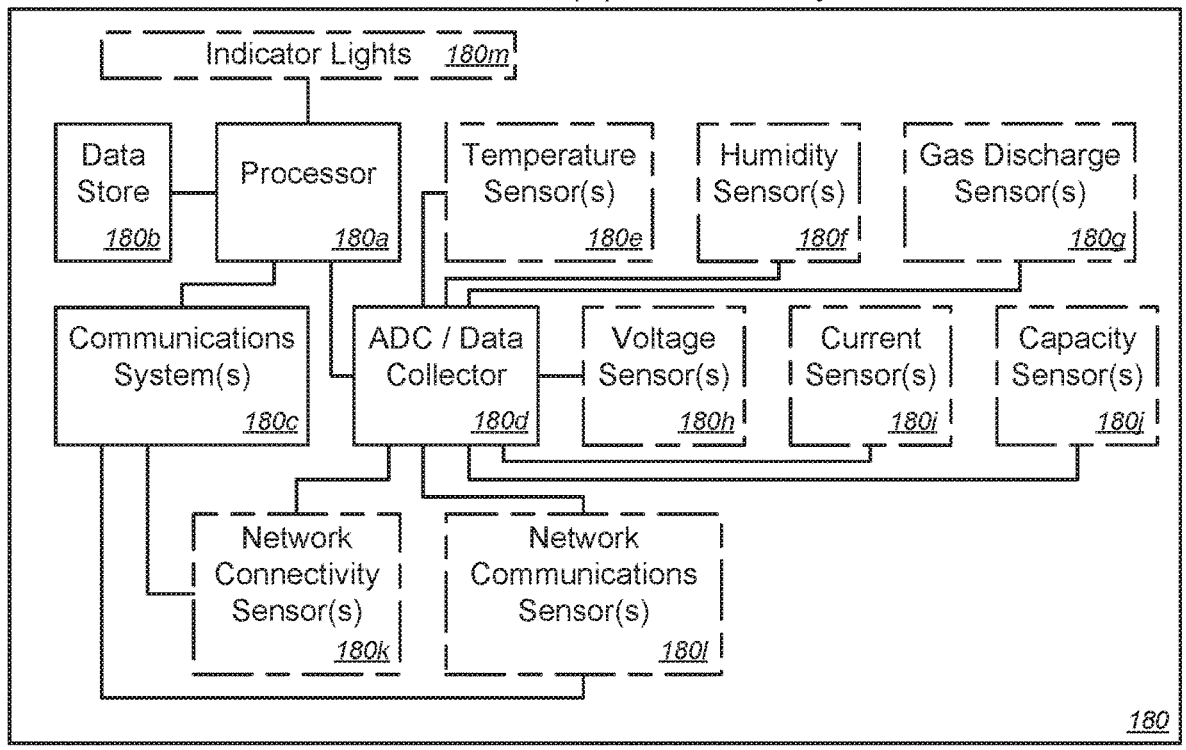
FIGS. 1B and 1C are schematic diagrams illustrating non-limiting examples of telecommunications equipment sensors or battery sensors that may be implemented in the system of FIG. 1A, in accordance with various embodiments.
Figure 1C:
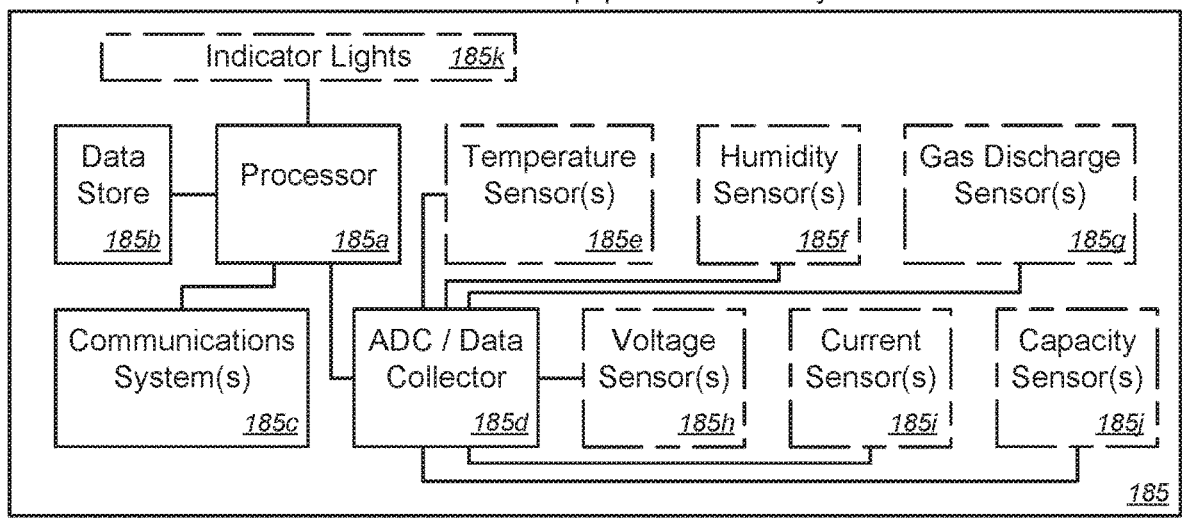

With reference to the figures, FIGS. 1A-1C (collectively, "FIG. 1") are schematic diagrams illustrating a system 100 for implementing telecommunications equipment health monitoring and management, in accordance with various embodiments. FIGS. 1B and 1C are schematic diagrams illustrating non-limiting examples of telecommunications equipment sensors or battery sensors that may be implemented in the system of FIG. 1A, in accordance with various embodiments.

In the non-limiting embodiment of FIG. 1, system 100 might comprise a computing system 105a and corresponding database(s) 110a that is local to the computing system 105a. In some cases, the database(s) 110a might be external, yet communicatively coupled, to the computing system 105a. In other cases, the database(s) 110a might be integrated within the computing system 105a. System 100, according to some embodiments, might further comprise one or more user devices 115 and one or more display devices 120, each either associated with user(s) 125 and/or viewable or usable by user(s) 125. The computing system(s) 105a, database(s) 110a, user device(s) 115, display device(s) 120, and user(s) 125 might be disposed in service provider facility 130 (which might include, but is not limited to, a central office ("CO"), a service operations headquarters, and/or the like) that is associated with, or operated by, a service provider.

System 100 might further comprise one or more telecommunications equipment 135a-135n (collectively, "telecommunications equipment 135" or the like), one or more batteries 140a-140n (collectively, "batteries 140" or the like), a battery string(s) 145 (which comprises two or more batteries 140 among the one or more batteries 140, or the like), first sensor(s) 150a-150n (collectively, "first sensors 150" or "sensors 150" or the like), and second sensor(s) 155a-155n (collectively, "second sensors 155" or "sensors 155" or the like), and/or the like, each of which may be disposed at a remote facility(ies) 160, which may be associated with, or operated by, the service provider. The remote facility(ies) 160 might each include, but is not limited to, a central office, a remote cabinet, or a digital subscriber line access multiplexer ("DSLAM"), and/or the like. System 100 might further comprise a network maintenance tunnel 170 and a network data store(s) 175 (e.g., an analytics-based data store such as Splunk®, Tableau®, or the like). In some cases, alternative or additional to computing system(s) 105a and corresponding database(s) 110a being disposed at service provider facility 130, system 100 might comprise remote computing system(s) 105b and corresponding database(s) 110b that are remote from service provider facility 130, while being accessible to or by telecommunications equipment 135, first sensor(s) 150, and/or second sensor(s) 155 via network(s) 165 (and, in the case of sensor(s) 150 and/or 155, via network maintenance tunnel 170, or the like), and performing functions similar to that performed by computing system(s) 105a and corresponding database(s) 110a, respectively. The telecommunications equipment 135 might communicatively couple to computing system(s) 105a or 105b (collectively, "computing system(s) 105" or the like) via network(s) 165 and via regular network routes or pathways, while the sensor(s) 150 and/or 155 might communicatively couple to computing system(s) 105 via network(s) 165 and via the network maintenance tunnel 170. According to some embodiments, the network maintenance tunnel 170 might include, but is not limited to, one of a generic routing encapsulation ("GRE") tunnel, a business support systems ("BSS") communications line, an operations support systems ("OSS") communications line, or a virtual private network ("VPN") communications connection, or the like. In some cases, the network maintenance tunnel 170 might be a communications tunnel that transfers data over the network(s) 165 without utilizing bandwidth associated with customers of a service provider operating the network(s) 165.

In some instances, the telecommunications equipment 135 might include, without limitation, at least one of one or more analog switches, one or more digital switches, one or more voice over Internet protocol ("VoIP") switches, one or more multilayer switches, one or more protocol converters, one or more base transceiver stations, one or more multiplexers, one or more customer office terminals, one or more modems, one or more routers, one or more network nodes, one or more gateway devices, one or more bridges, one or more bridge routers, one or more repeaters, one or more repeater hubs, one or more proxy servers, one or more firewalls, one or more network address translators, one or more network interface controllers, one or more wireless network interface controllers, one or more terminal adapters (e.g., integrated services digital network ("ISDN") terminal adapters, or the like), one or more line drivers, and/or the like.

In some embodiments, the first sensor(s) 150 might be coupled to the telecommunications equipment 135, as individual sensors or as sets of sensors, and might each include, without limitation, at least one of a voltmeter, an ammeter, a multimeter, a thermometer, a humidity sensor, a gas discharge sensor, network connectivity sensor, or network communications sensor, and/or the like. In a similar manner, the second sensor(s) 155 might be coupled to the batteries 140 and/or the battery string(s) 145 providing power to the telecommunications equipment 135, as individual sensors or as sets of sensors, and might each include, but is not limited to, at least one of a voltmeter, an ammeter, a multimeter, a thermometer, a humidity sensor, a gas discharge sensor, network connectivity sensor, or network communications sensor, and/or the like.

In operation, at least one sensor among the sensors 150 and/or sensors 155 might monitor one or more characteristics of each of at least one of one or more telecommunications equipment 135 in a remote facility 160, one or more telecommunications equipment batteries 140 within a battery string 145 providing power to telecommunications equipment 135 in a remote facility 160, or one or more battery strings 145 providing power to telecommunications equipment 135 in a remote facility 160, and/or the like. The at least one sensor might send the monitored one or more characteristics of each of the at least one of the one or more telecommunications equipment 135, the one or more telecommunications equipment batteries 140, or the one or more battery strings 145, via network maintenance tunnel 170, in some cases to network data store(s) 175. Computing system(s) 105 might subsequently receive the monitored one or more characteristics of each of the at least one of the one or more telecommunications equipment 135, the one or more telecommunications equipment batteries 140, or the one or more battery strings 145, in some cases from network data store(s) 175, over the network(s) 165 (in some instances, via network maintenance tunnel 170).

Computing system(s) 105 might analyze the monitored one or more characteristics of each of the at least one of the one or more telecommunications equipment 135, the one or more telecommunications equipment batteries 140, or the one or more battery strings 145 to identify each telecommunications equipment, each telecommunications equipment battery, or each battery string having equipment health issues. Based on a determination that one or more of at least one telecommunications equipment, at least one telecommunications equipment battery, or at least one battery string have equipment health issues, computing system(s) 105 might send a notification to user(s) 125 (e.g., by sending the notification to user device(s) 115, or the like), the notification comprising information regarding the one or more of the at least one telecommunications equipment, the at least one telecommunications equipment battery, or the at least one battery string having equipment health issues, and/or the like.

In some cases, the one or more characteristics of each of the at least one of the one or more telecommunications equipment 135, the one or more telecommunications equipment batteries 140, or the one or more battery strings 145 might include, without limitation, at least one of voltage, amperage, electrical charge, temperature, humidity, gas discharge, network connectivity, or network communications characteristics, and/or the like. In some instances, the equipment health issues might include, but are not limited to, at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues, and/or the like.

Figure 3:
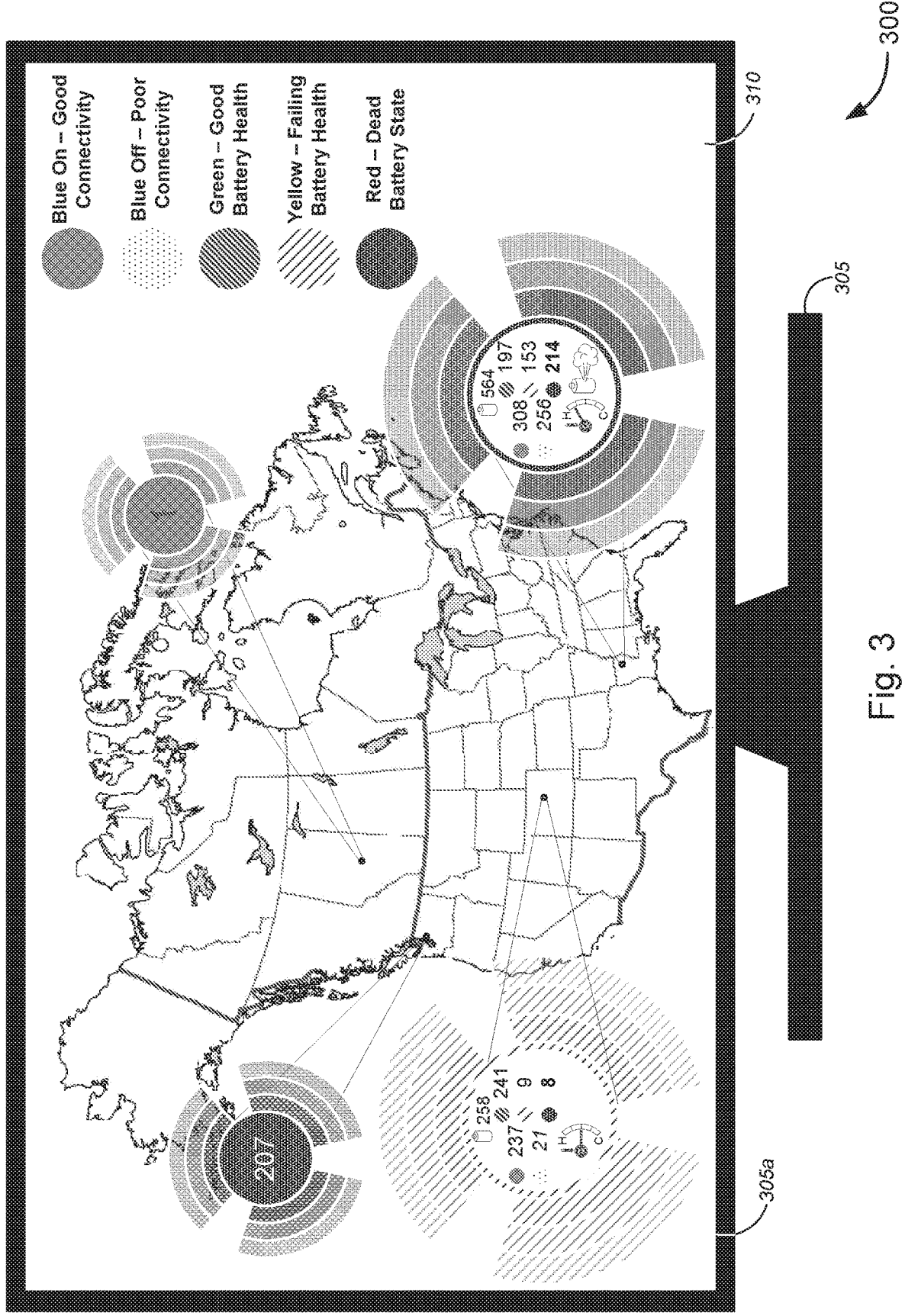
FIG. 3 is a schematic diagram illustrating a non-limiting example of a map view or graphical visualization as displayed on a display device that presents to a user characteristics of monitored telecommunications equipment or monitored batteries or battery strings providing power to telecommunications equipment that are located at remote facilities, as part of telecommunications equipment health monitoring and management, in accordance with various embodiments.

According to some embodiments, computing system(s) 105 might generate a graphical visualization that presents at least one of the monitored one or more characteristics of each of the at least one of the one or more telecommunications equipment 135, the one or more telecommunications equipment batteries 140, or the one or more battery strings 145 or analytics summarizing the monitored one or more characteristics of each of the at least one of the one or more telecommunications equipment 135, the one or more telecommunications equipment batteries 140, or the one or more battery strings 145, and/or the like. The computing system(s) 105 might subsequently display, on a display device (e.g., display device(s) 120) that is viewable by the user(s) 125, the generated graphical visualization (such as shown in FIG. 3 or the like).

With reference to FIGS. 1B and 1C, each of the one or more first sensors 150 or each of the one or more second sensors 155 may be embodied by one of the telecommunications equipment or battery sensor 180 (FIG. 1B) or the telecommunications equipment or battery sensor 185 (FIG. 1C). Referring to FIG. 1B, the telecommunications equipment or battery sensor 180 might comprise a processor 180*a* (which might include, but is not limited to, at least one of an open source IoT platform (e.g., NodeMCU, or the like), a microprocessor, a microcontroller (e.g., Arduino Nano microcontroller, or the like)), a data store 180*b*, a communications system(s) 180*c*, an analog to digital ("ADC") converter or data collector 180*d* (which might include, but is not limited to, a microcontroller (e.g., Arduino Nano microcontroller, or the like), an ADC, or the like), one or more sensors (including, but not limited to, at least one of temperature sensor(s) 180(*e*) (optional), humidity sensor(s) 180(*f*) (optional), gas discharge sensor(s) 180(*g*) (optional), voltage sensor(s) 180(*h*) (optional), current sensor(s) 180(*i*) (optional), capacity sensor(s) 180(*j*) (optional), network connectivity sensor(s) 180(*k*) (optional), or network communications sensor(s) 180(*l*) (optional), and/or the like), and one or more indicator lights 180(*m*) (optional), and/or the like. In some cases, the voltage sensor(s) 180(*h*) might comprise a voltage divider circuit that monitors the charge and drain rate of batteries, etc.

In some instances, the one or more indicator lights 180(*m*) might include, without limitation, light emitting diodes ("LEDs"), a light bulb, display screen(s) or portion(s) of a display screen, or other light sources. In some cases, the one or more indicator lights 180(*m*) might include, but is not limited to, a blue colored indicator light, a green colored indicator light, a yellow colored indicator light, and a red colored indicator light, or the like. The blue colored indicator light, when in the on state, might indicate that the telecommunications equipment 135, the battery 140, and/or the battery string 145 that the sensor 180 is monitoring might have good (network) connectivity with at least the network data store(s) 175 and/or the network maintenance tunnel 170, while the blue colored indicator light, when in the off state, might indicate that the telecommunications equipment 135, the battery 140, and/or the battery string 145 that the sensor 180 is monitoring might have poor (network) connectivity with at least the network data store(s) 175 and/or the network maintenance tunnel 170. The green colored indicator light, when in the on state, might indicate that the telecommunications equipment 135, the battery 140, and/or the battery string 145 that the sensor 180 is monitoring might have good battery health, while the yellow colored indicator light, when in the on state, might indicate that the telecommunications equipment 135, the battery 140, and/or the battery string 145 that the sensor 180 is monitoring might have failing battery health (e.g., battery draining too quickly, etc.), and the red colored indicator light, when in the on state, might indicate that the telecommunications equipment 135, the battery 140, and/or the battery string 145 that the sensor 180 is monitoring might have poor battery health or dead battery state.

Turning to FIG. 1C, the telecommunications equipment or battery sensor 185 might comprise a processor 185*a* (which might include, but is not limited to, at least one of an open source IoT platform (e.g., NodeMCU, or the like), a microprocessor, a microcontroller (e.g., Arduino Nano microcontroller, or the like)), a data store 185*b*, a communications system(s) 185*c*, an analog to digital ("ADC") converter or data collector 185*d* (which might include, but is not limited to, a microcontroller (e.g., Arduino Nano microcontroller, or the like), an ADC, or the like), one or more sensors (including, but not limited to, at least one of temperature sensor(s) 185(*e*) (optional), humidity sensor(s) 185(*f*) (optional), gas discharge sensor(s) 185(*g*) (optional), voltage sensor(s) 185(*h*) (optional), current sensor(s) 185(*i*) (optional), or capacity sensor(s) 185(*j*) (optional), and/or the like), and one or more indicator lights 185(*k*) (optional), and/or the like. In some cases, the voltage sensor(s) 185(*h*) might comprise a voltage divider circuit that monitors the charge and drain rate of batteries, etc.

In some instances, the one or more indicator lights 185(*m*) might include, without limitation, light emitting diodes ("LEDs"), a light bulb, display screen(s) or portion(s) of a display screen, or other light sources. In some cases, the one or more indicator lights 185(*m*) might include, but is not limited to, a blue colored indicator light, a green colored indicator light, a yellow colored indicator light, and a red colored indicator light, or the like. The blue colored indicator light, when in the on state, might indicate that the telecommunications equipment 135, the battery 140, and/or the battery string 145 that the sensor 185 is monitoring might have good (network) connectivity with at least the network data store(s) 175 and/or the network maintenance tunnel 170, while the blue colored indicator light, when in the off state, might indicate that the telecommunications equipment 135, the battery 140, and/or the battery string 145 that the sensor 185 is monitoring might have poor (network) connectivity with at least the network data store(s) 175 and/or the network maintenance tunnel 170. The green colored indicator light, when in the on state, might indicate that the telecommunications equipment 135, the battery 140, and/or the battery string 145 that the sensor 185 is monitoring might have good battery health, while the yellow colored indicator light, when in the on state, might indicate that the telecommunications equipment 135, the battery 140, and/or the battery string 145 that the sensor 185 is monitoring might have failing battery health, and the red colored indicator light, when in the on state, might indicate that the telecommunications equipment 135, the battery 140, and/or the battery string 145 that the sensor 185 is monitoring might have poor battery health or dead battery state.

These and other functions of the system 100 (and its components) are described in greater detail below with respect to FIGS. 2-4.

Figure 2:
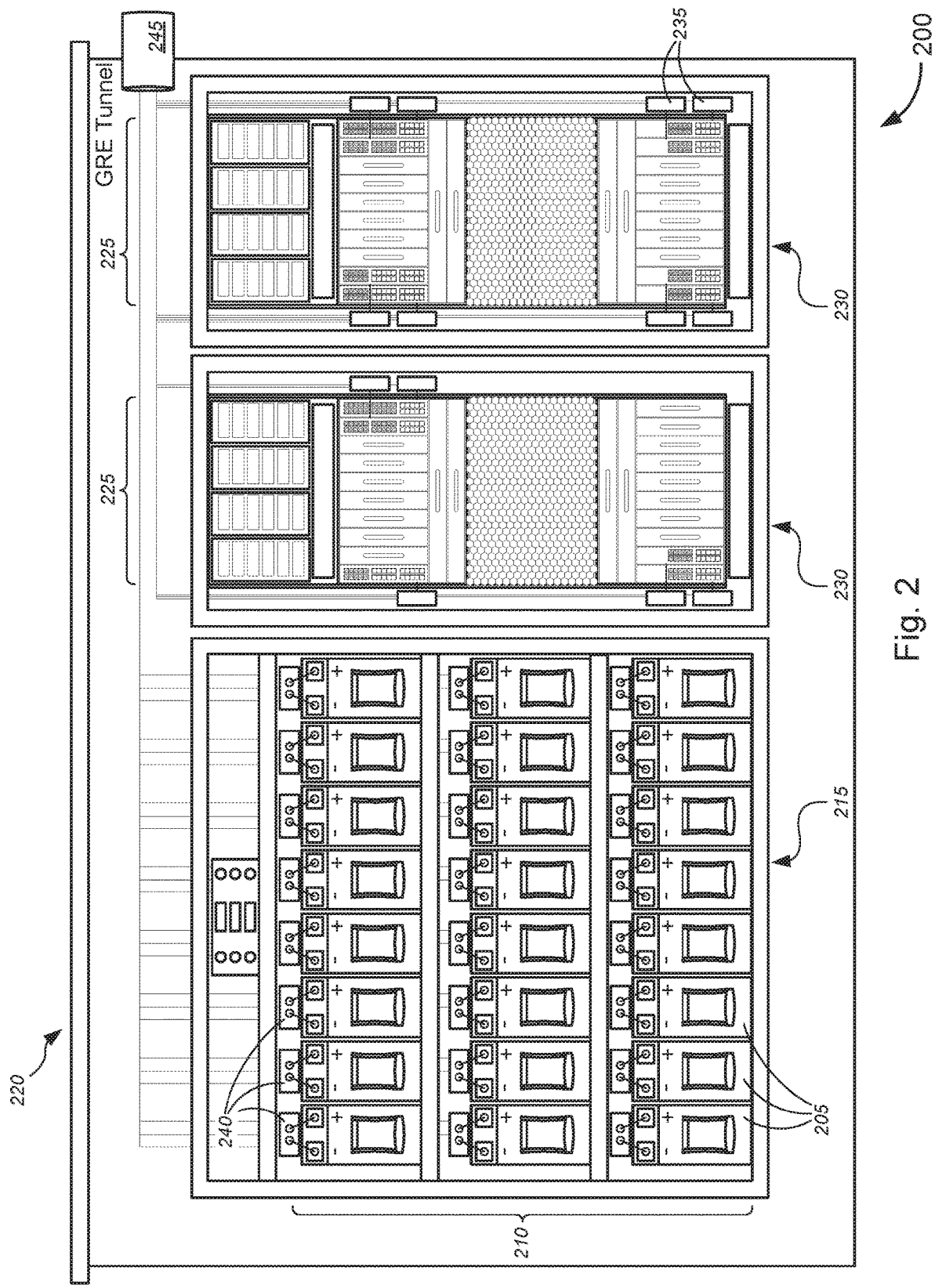
FIG. 2 is a schematic diagram illustrating a non-limiting example of a remote facility in which telecommunications equipment health monitoring and management may be implemented, in accordance with various embodiments.

FIG. 2 is a schematic diagram illustrating a non-limiting example 200 of a remote facility in which telecommunications equipment health monitoring and management may be implemented, in accordance with various embodiments.

FIG. 2 depicts a plurality of telecommunications batteries 205 that are connected in a battery string(s) 210 within a battery rack 215 that is located within a telecommunications office or remote facility 220 (e.g., a central office, a remote cabinet, or a digital subscriber line access multiplexer ("DSLAM"), and/or the like), which might house one or more telecommunications equipment or telecommunications equipment components 225 mounted on one or more telecommunications equipment racks 230. The telecommunications batteries 205—which might be either an integrated wireless capable battery/tester or an external wireless capable battery tester and battery (both as described in related U.S. patent application Ser. No. 15/043,931 (the "'931 application"), filed Feb. 15, 2016 by Keith E. Younger, entitled, "Wireless Capable Battery," the disclosure of which is incorporated herein by reference in its entirety for all purposes)—serve to provide primary or backup power to the one or more telecommunications equipment components 225 that are housed or mounted in the telecommunications equipment racks 230.

According to some embodiments, the telecommunications batteries 205 might include, without limitation, valve regulated lead acid batteries (e.g., 12V 170 Ah or 190 Ah front terminal battery strings, or the like) or Ni-Cad batteries (e.g., Ni-Cad 150 Ah cell battery strings, or the like), and/or the like that may be used in remote cabinets, or lead acid batteries or the like that might be used in central offices, and/or the like. In some cases, some telecommunications batteries 205 might have lengths ranging between ~5.59 inches (or ~14.20 cm) or shorter and ~16.60 inches (or ~42.16 cm) or longer, widths ranging between ~10.44 inches (or ~26.52 cm) or shorter and ~17.25 inches (or ~43.82 cm) or wider, and heights of between ~18.25 inches (or ~46.36 cm) or shorter and ~28.90 inches (or ~73.41 cm) or taller. These dimensions in some cases might be indicative of the limited space in which each battery might reside, and thus any integrated battery/battery tester must (in such cases) be designed to fit within such size limitations. In other cases, placement sizes might allow for expansion of the battery in at least one of the three dimensions to accommodate the integrated battery/battery tester or to accommodate an external battery tester for each battery.

System 200 might further comprise one or more first sensors 235, one or more second sensors 240, and a network maintenance tunnel 245 (e.g., a generic routing encapsulation ("GRE") tunnel, a BSS communications line, an OSS communications line, or a VPN communications connection, or the like). In some embodiments, the one or more first sensors 235 might be coupled to the telecommunications equipment or telecommunications equipment components 225 that are housed in or mounted on the telecommunications equipment racks 230, as individual sensors or as sets of sensors, and might each include, without limitation, at least one of a voltmeter, an ammeter, a multimeter, a thermometer, a humidity sensor, a gas discharge sensor, network connectivity sensor, or network communications sensor, and/or the like. In a similar manner, the one or more second sensors 240 might be coupled to the batteries 205 and/or the battery string(s) 210 providing power to the telecommunications equipment or telecommunications equipment components 225 that are housed in or mounted on the telecommunications equipment racks 230, as individual sensors or as sets of sensors, and might each include, but is not limited to, at least one of a voltmeter, an ammeter, a multimeter, a thermometer, a humidity sensor, a gas discharge sensor, network connectivity sensor, or network communications sensor, and/or the like.

In some instances, the telecommunications equipment or telecommunications equipment components 225 that are housed in or mounted on the telecommunications equipment racks 230 might include, without limitation, at least one of one or more analog switches, one or more digital switches, one or more voice over Internet protocol ("VoIP") switches, one or more multilayer switches, one or more protocol converters, one or more base transceiver stations, one or more multiplexers, one or more customer office terminals, one or more modems, one or more routers, one or more network nodes, one or more gateway devices, one or more bridges, one or more bridge routers, one or more repeaters, one or more repeater hubs, one or more proxy servers, one or more firewalls, one or more network address translators, one or more network interface controllers, one or more wireless network interface controllers, one or more terminal adapters (e.g., integrated services digital network ("ISDN") terminal adapters, or the like), one or more line drivers, and/or the like.

In operation, at least one sensor among the sensors 235 and/or sensors 240 might monitor one or more characteristics of each of at least one of one or more telecommunications equipment 225 in a remote facility 220, one or more telecommunications equipment batteries 205 within a battery string 210 providing power to telecommunications equipment 225 in a remote facility 220, or one or more battery strings 210 providing power to telecommunications equipment 225 in a remote facility 220, and/or the like. The at least one sensor might send the monitored one or more characteristics of each of the at least one of the one or more telecommunications equipment 225, the one or more telecommunications equipment batteries 205, or the one or more battery strings 210, via network maintenance tunnel 245 (e.g., a GRE tunnel, a BSS communications line, an OSS communications line, or a VPN communications connection, or the like), in some cases to network data store(s) (e.g., network data store(s) 175 of FIG. 1, or the like). Computing system(s) (e.g., computing system(s) 105a or 105b of FIG. 1, or the like) might subsequently receive the monitored one or more characteristics of each of the at least one of the one or more telecommunications equipment 225, the one or more telecommunications equipment batteries 205, or the one or more battery strings 210, in some cases from network data store(s) (e.g., network data store(s) 175 of FIG. 1, or the like), over the network(s) (e.g., network(s) 165 of FIG. 1, or the like) (in some instances, via network maintenance tunnel 245).

Computing system(s) (e.g., computing system(s) 105a or 105b of FIG. 1, or the like) might analyze the monitored one or more characteristics of each of the at least one of the one or more telecommunications equipment 225, the one or more telecommunications equipment batteries 205, or the one or more battery strings 210 to identify each telecommunications equipment, each telecommunications equipment battery, or each battery string having equipment health issues. Based on a determination that one or more of at least one telecommunications equipment, at least one telecommunications equipment battery, or at least one battery string have equipment health issues, computing system(s) (e.g., computing system(s) 105a or 105b of FIG. 1, or the like) might send a notification to a user (e.g., by sending the notification to user device(s) 115 of FIG. 1, or the like), the notification comprising information regarding the one or more of the at least one telecommunications equipment, the at least one telecommunications equipment battery, or the at least one battery string having equipment health issues, and/or the like.

In some instances, the equipment health issues might include, but are not limited to, at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues, and/or the like.

According to some embodiments, computing system(s) (e.g., computing system(s) 105a or 105b of FIG. 1, or the like) might generate a graphical visualization that presents at least one of the monitored one or more characteristics of each of the at least one of the one or more telecommunications equipment 225, the one or more telecommunications equipment batteries 205, or the one or more battery strings 210 or analytics summarizing the monitored one or more characteristics of each of the at least one of the one or more telecommunications equipment 225, the one or more telecommunications equipment batteries 205, or the one or more battery strings 210, and/or the like. The computing system(s) (e.g., computing system(s) 105a or 105b of FIG. 1, or the like) might subsequently display, on a display device (e.g., display device(s) 120 of FIG. 1, or the like) that is viewable by the user, the generated graphical visualization.

FIG. 3 is a schematic diagram illustrating a non-limiting example 300 of a map view or graphical visualization as displayed on a display device that presents to a user characteristics of monitored telecommunications equipment or monitored batteries or battery strings providing power to telecommunications equipment that are located at remote facilities, as part of telecommunications equipment health monitoring and management, in accordance with various embodiments.

In the non-limiting embodiment of FIG. 3, display device 305 (in this case, a monitor, or the like) might comprise a display screen 305a, which might include, without limitation, at least one of a liquid crystal display ("LCD") screen, a light emitting diode ("LED") display screen, an organic LED ("OLED") display screen, a quantum dot LED ("QLED") display screen, or a touchscreen display screen, and/or the like. Although the display device 305 of FIG. 3 is depicted as a monitor, the various embodiments are not so limited, and any suitable display device may be used, including, but not limited to, a television, a monitor, a laptop monitor, a display of a smart phone, a display of a mobile phone, a display of tablet computer, a display of an augmented reality headset, a display of a wearable device, and/or the like.

In accordance with the various embodiments, a map view or graphical visualization 310 might be generated, as described herein with respect to FIGS. 1 and 4, with such map view or graphical visualization 310 being displayed on the display screen 305a, as illustrated in the non-limiting embodiment of FIG. 3.

In the non-limiting example map view or graphical visualization 310, a map of North America is depicted, with four example remote facilities highlighted. Such example remote facilities—which might include, but are not limited to, a central office, a remote cabinet, or a digital subscriber line access multiplexer ("DSLAM"), and/or the like—are depicted in or around the following cities: Denver, Colo.; Monroe, La.; Seattle, Wash.; and Edmonton, Alberta, Canada. These are merely illustrative and many more, or fewer, remote facilities may be depicted on the map based on user selection or user preference, with remote facilities at other locations depicted as desired or as part of the default or user settings. In some cases, at particular wide zoom settings, the remote facility icon might represent multiple remote facilities within that particular area with a consolidated accounting of equipment and/or batteries and characteristics of such equipment and/or batteries. Zooming in on or around that location might result in multiple locations being individually represented by their own remote facility icons (depending on whether the remote facilities are sufficient distinguishable at that level of zoom). If two or more remote facilities cannot be distinguishable at particular levels of zoom, said two or more remote facilities (referred to herein as a set of remote facilities, or the like) are represented by a consolidated icon that presents consolidated information regarding the equipment and/or batteries and characteristics of such equipment and/or batteries of the two or more remote facilities.

As shown in FIG. 3, alert notifications representing each remote facility or each set of remote facilities might be represented by a circular icon surrounded by expanding waves that fade outward from the circular icon. Each circular icon (and set of expanding waves) is represented by either a color (e.g., blue, green, yellow, red, etc.) and/or a shading or hash pattern (e.g., light black and white checkered pattern representing "blue on"; scattered dot pattern representing "blue off"; tight diagonal or back slash pattern representing "green"; wider spaced diagonal or forward slash pattern representing "yellow"; dark white hexagonal pattern on black background pattern representing "red"; etc.). In the example 300 of FIG. 3, the color or pattern representing "blue on" indicates that the equipment and/or battery(ies) (or battery string(s)) has good network connectivity (e.g., connectivity with a network data store(s) via a network(s), in some cases, via a GRE tunnel or other network maintenance tunnel, or the like), while the color or pattern representing "blue off" indicates that the equipment and/or battery(ies) (or battery string(s)) has poor network connectivity (e.g., connectivity with a network data store(s) via a network(s), in some cases, via a GRE tunnel or other network maintenance tunnel, or the like). Further, in example 300 of FIG. 3, the color or pattern representing "green" indicates that the equipment and/or battery(ies) (or battery string(s)) has good battery health, while the color or pattern representing "yellow" indicates that the equipment and/or battery(ies) (or battery string(s)) has failing battery health (e.g., battery draining too quickly, etc.), and the color or pattern representing "red" indicates that the equipment and/or battery(ies) (or battery string(s)) has bad battery health or has a dead battery state, and so on.

The circular icons might contain a single number indicating the number of equipment and/or batteries having failing or poor equipment health characteristics (or the number of customer premises or number of residential or business neighborhoods that are affected by equipment and/or batteries having failing or poor equipment health characteristics), as depicted by the circular icons corresponding to the remote facility (or set of remote facilities) in or around Seattle (with 207 equipment and/or batteries having failing or poor equipment health characteristics (in this case, indicating bad battery health or dead battery state, as denoted by the "red" color or pattern) (or 207 customer premises, or residential or business neighborhoods, that are affected by equipment and/or batteries having failing or poor equipment health characteristics)). In a similar manner, with smaller remote facilities, the circular icons might contain a single number indicating the number of equipment and/or batteries having good equipment health characteristics (or the number of customer premises or number of residential or business neighborhoods that are affected by equipment and/or batteries having good equipment health characteristics), as depicted by the circular icon corresponding to the remote facility (or set of remote facilities) in or around Edmonton (with 1 equipment and/or battery having good equipment health characteristics (in this case, indicating good connectivity, as denoted by the "blue on" color or pattern) (or 1 customer premises, or residential or business neighborhood, that is affected by equipment and/or batteries having good equipment health characteristics)).

According to some embodiments, alternative or additional to the circular icons having a single number summarizing the information on equipment health, the circular icons might contain a plurality of icons indicative of a set of characteristics, including, but not limited to, at least one of voltage, amperage, electrical charge, temperature, humidity, gas discharge, network connectivity, or network communications characteristics, and/or the like. Alternatively, or additionally, the plurality of icons may be indicative of analytics summarizing such characteristics, including, without limitation, at least one of good network connectivity, poor network connectivity, good network communications characteristics, poor network communications characteristics, good battery health, failing battery health, poor battery health or dead battery state, percentage of charge, normal battery charge rate, abnormal battery charge rate, percentage of drain, normal battery drain rate, abnormal battery drain rate, high relative temperature (or temperature values exceeding predetermined high temperature thresholds), normal relative temperature (or temperature values within a predetermined normal temperature range), low relative temperature (or temperature values dropping below predetermined low temperature thresholds), detected gas leakage, high relative humidity (or humidity levels exceeding predetermined high humidity thresholds), normal relative humidity (or humidity levels within a predetermine normal humidity range), low relative humidity (or humidity levels dropping below predetermined low humidity thresholds), and/or the like.

For example, the circular icons might contain a plurality of icons indicating the following (although not limited to these): the total number of equipment and/or batteries (or the number of customer premises or number of residential or business neighborhoods that are affected by the equipment and/or batteries), as depicted by the number beside the battery icon; the number of equipment and/or batteries having good connectivity (or the number of customer premises or number of residential or business neighborhoods that are affected by the equipment and/or batteries having good connectivity), as depicted by the number beside the "blue on" color or pattern; the number of equipment and/or batteries having poor connectivity (or the number of customer premises or number of residential or business neighborhoods that are affected by the equipment and/or batteries having poor connectivity), as depicted by the number beside the "blue off" color or pattern; the number of equipment and/or batteries having good battery health (or the number of customer premises or number of residential or business neighborhoods that are affected by the equipment and/or batteries having good battery health), as depicted by the number beside the "green" color or pattern; the number of equipment and/or batteries having failing battery health (or the number of customer premises or number of residential or business neighborhoods that are affected by the equipment and/or batteries having failing battery health), as depicted by the number beside the "yellow" color or pattern; the number of equipment and/or batteries having poor battery health or dead battery state (or the number of customer premises or number of residential or business neighborhoods that are affected by the equipment and/or batteries having poor battery health or dead battery state), as depicted by the number beside the "red" color or pattern; the average relative temperature as measured at the remote facility (or set of remote facilities), as depicted by the relative temperature icon; presence of gas leakage at the remote facility (or at one or more remote facilities among the set of remote facilities), as depicted by the battery with gas leak icon; etc.

With reference to the non-limiting FIG. 3, the circular icon corresponding to the remote facility (or set of facilities) in or around Denver contains a plurality of icons indicating the following: a total of 258 equipment and/or batteries (or 258 customer premises or 258 residential or business neighborhoods that are affected by the equipment and/or batteries), as depicted by the number "258" beside the battery icon; 237 equipment and/or batteries having good connectivity (or 237 customer premises or 237 residential or business neighborhoods that are affected by the equipment and/or batteries having good connectivity), as depicted by the number "237" beside the "blue on" color or pattern; 21 equipment and/or batteries having poor connectivity (or 21 customer premises or 21 residential or business neighborhoods that are affected by the equipment and/or batteries having poor connectivity), as depicted by the number "21" (further emphasized by italic type form) beside the "blue off" color or pattern; 241 equipment and/or batteries having good battery health (or 241 customer premises or 241 residential or business neighborhoods that are affected by the equipment and/or batteries having good battery health), as depicted by the number "241" beside the "green" color or pattern; 9 equipment and/or batteries having failing battery health (or 9 customer premises or 9 residential or business neighborhoods that are affected by the equipment and/or batteries having failing battery health), as depicted by the number "9" beside the "yellow" color or pattern; 8 equipment and/or batteries having poor battery health or dead battery state (or 8 customer premises or 8 residential or business neighborhoods that are affected by the equipment and/or batteries having poor battery health or dead battery state), as depicted by the number "8" (further emphasized by boldface type form) beside the "red" color or pattern; a normal average relative temperature as measured at the remote facility (or set of remote facilities), as depicted by the relative temperature icon pointing to a mid-relative temperature level; etc. The overall characteristic of the remote facility (or set of remote facilities) in or around Denver, taking into account the characteristics or analytics summarizing such characteristics, is summarized as a "yellow" state, indicative of presence of equipment and/or batteries or battery strings having failing battery health.

The circular icon corresponding to the remote facility (or set of facilities) in or around Monroe contains a plurality of icons indicating the following: a total of 564 equipment and/or batteries (or 564 customer premises or 564 residential or business neighborhoods that are affected by the equipment and/or batteries), as depicted by the number "564" beside the battery icon; 308 equipment and/or batteries having good connectivity (or 308 customer premises or 308 residential or business neighborhoods that are affected by the equipment and/or batteries having good connectivity), as depicted by the number "308" beside the "blue on" color or pattern; 256 equipment and/or batteries having poor connectivity (or 256 customer premises or 256 residential or business neighborhoods that are affected by the equipment and/or batteries having poor connectivity), as depicted by the number "256" (further emphasized by italic type form) beside the "blue off" color or pattern; 197 equipment and/or batteries having good battery health (or 197 customer premises or 197 residential or business neighborhoods that are affected by the equipment and/or batteries having good battery health), as depicted by the number "197" beside the "green" color or pattern; 153 equipment and/or batteries having failing battery health (or 153 customer premises or 153 residential or business neighborhoods that are affected by the equipment and/or batteries having failing battery health), as depicted by the number "153" beside the "yellow" color or pattern; 214 equipment and/or batteries having poor battery health or dead battery state (or 214 customer premises or 214 residential or business neighborhoods that are affected by the equipment and/or batteries having poor battery health or dead battery state), as depicted by the number "214" (further emphasized by boldface type form) beside the "red" color or pattern; a high average relative temperature as measured at the remote facility (or set of remote facilities), as depicted by the relative temperature icon pointing to a high relative temperature level; presence of gas leakage at the remote facility (or at one or more remote facilities among the set of remote facilities), as depicted by the battery with gas leak icon; etc. The overall characteristic of the remote facility (or set of remote facilities) in or around Monroe, taking into account the characteristics or analytics summarizing such characteristics, is summarized as a "red" state, indicative of presence of equipment and/or batteries or battery strings having poor battery health or dead battery state.

The map view or graphical visualization 310 as depicted in FIG. 3 is merely illustrative, and in no way limits the various embodiments to generation and/or display of such particular map view of graphical visualization (or the particular colors, patterns, or icons) as shown.

FIGS. 4A-4D (collectively, "FIG. 4") are flow diagrams illustrating a method 400 for implementing telecommunications equipment health monitoring and management, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
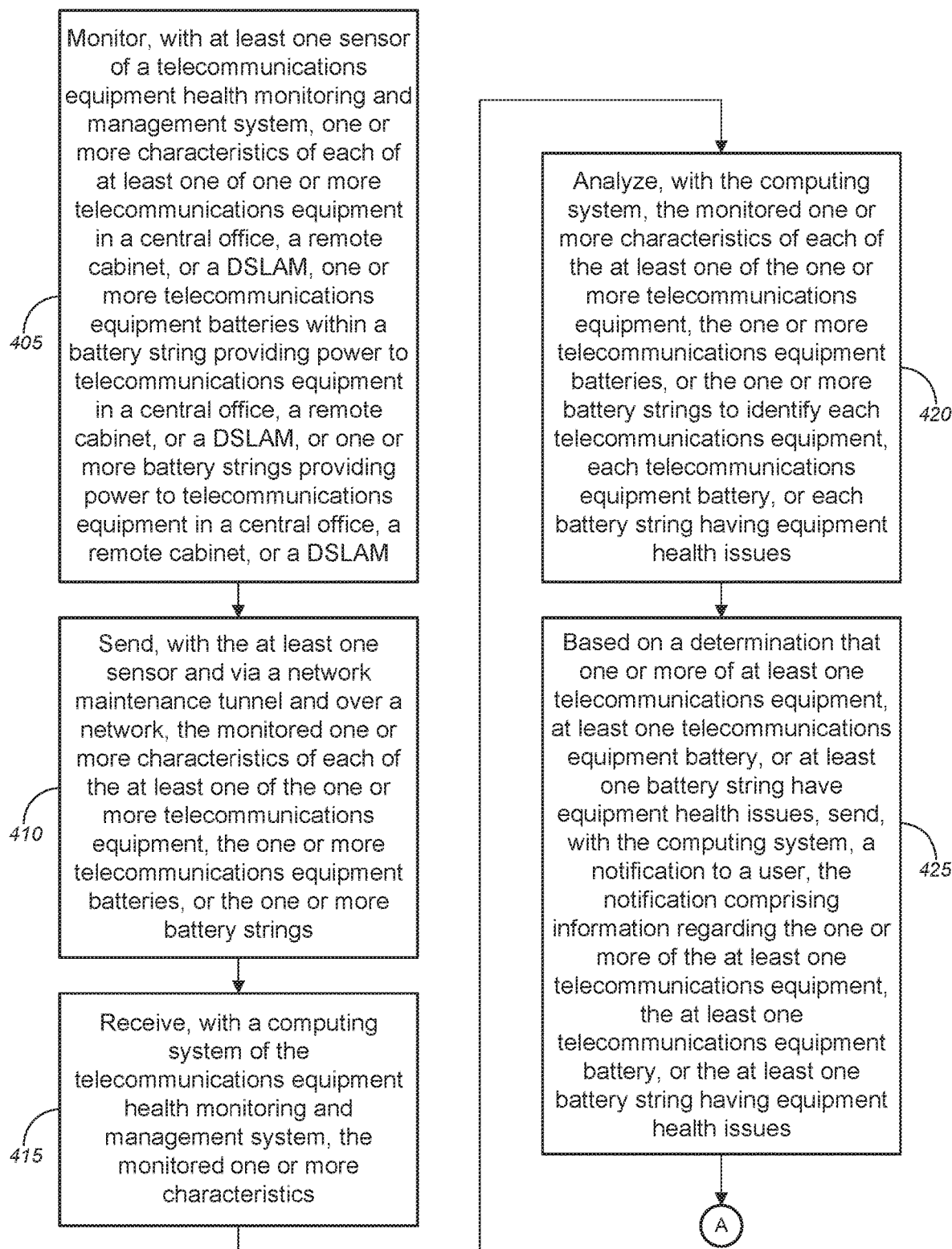
FIGS. 4A-4D are flow diagrams illustrating a method for implementing telecommunications equipment health monitoring and management, in accordance with various embodiments.

In the non-limiting embodiment of FIG. 4A, method 400, at block 405, might comprise monitoring, with at least one sensor of a telecommunications equipment health monitoring and management system, one or more characteristics of each of at least one of one or more telecommunications equipment in a remote facility (which might include, but is not limited to, a central office, a remote cabinet, or a digital subscriber line access multiplexer ("DSLAM"), and/or the like), one or more telecommunications equipment batteries within a battery string providing power to telecommunications equipment in a remote facility, or one or more battery strings providing power to telecommunications equipment in a remote facility, and/or the like.

In some embodiments, the at least one sensor may be coupled to each equipment, battery, or battery string among the at least one of the one or more telecommunications equipment, the one or more telecommunications equipment batteries, or the one or more battery strings, and/or the like. In some cases, the at least one sensor might each include, without limitation, at least one of a voltmeter, an ammeter, a multimeter, a thermometer, a humidity sensor, a gas discharge sensor, network connectivity sensor, or network communications sensor, and/or the like. According to some embodiments, the one or more characteristics of each of the at least one of the one or more telecommunications equipment, the one or more telecommunications equipment batteries, or the one or more battery strings might include, but are not limited to, at least one of voltage, amperage, electrical charge, temperature, humidity, gas discharge, network connectivity, or network communications characteristics, and/or the like.

At block 410, method 400 might comprise sending, with the at least one sensor of the telecommunications equipment health monitoring and management system and via a network maintenance tunnel and over a network, the monitored one or more characteristics of each of the at least one of the one or more telecommunications equipment, the one or more telecommunications equipment batteries, or the one or more battery strings, and/or the like. In some instances, the network maintenance tunnel might include, without limitation, one of a generic routing encapsulation ("GRE") tunnel, a business support systems ("BSS") communications line, an operations support systems ("OSS") communications line, or a virtual private network ("VPN") communications connection, and/or the like. In some cases, the network maintenance tunnel might be a communications tunnel that transfers data over the network without utilizing bandwidth associated with customers of a service provider operating the network.

Method 400 might further comprise receiving, with a computing system of the telecommunications equipment health monitoring and management system, the monitored one or more characteristics of each of the at least one of the one or more telecommunications equipment, the one or more telecommunications equipment batteries, or the one or more battery strings, and/or the like (block 415). Method 400, at block 420, might comprise analyzing, with the computing system of the telecommunications equipment health monitoring and management system, the monitored one or more characteristics of each of the at least one of the one or more telecommunications equipment, the one or more telecommunications equipment batteries, or the one or more battery strings, and/or the like, to identify each telecommunications equipment, each telecommunications equipment battery, or each battery string having equipment health issues. At block 425, method 400 might comprise, based on a determination that one or more of at least one telecommunications equipment, at least one telecommunications equipment battery, or at least one battery string have equipment health issues, sending, with the computing system, a notification to a user, the notification comprising information regarding the one or more of the at least one telecommunications equipment, the at least one telecommunications equipment battery, or the at least one battery string having equipment health issues, and/or the like.

According to some embodiments, the equipment health issues might include, but is not limited to, at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues, and/or the like. Method 400 might continue onto the process at block 430 in FIG. 4B following the circular marker denoted, "A."

Figure 4B:
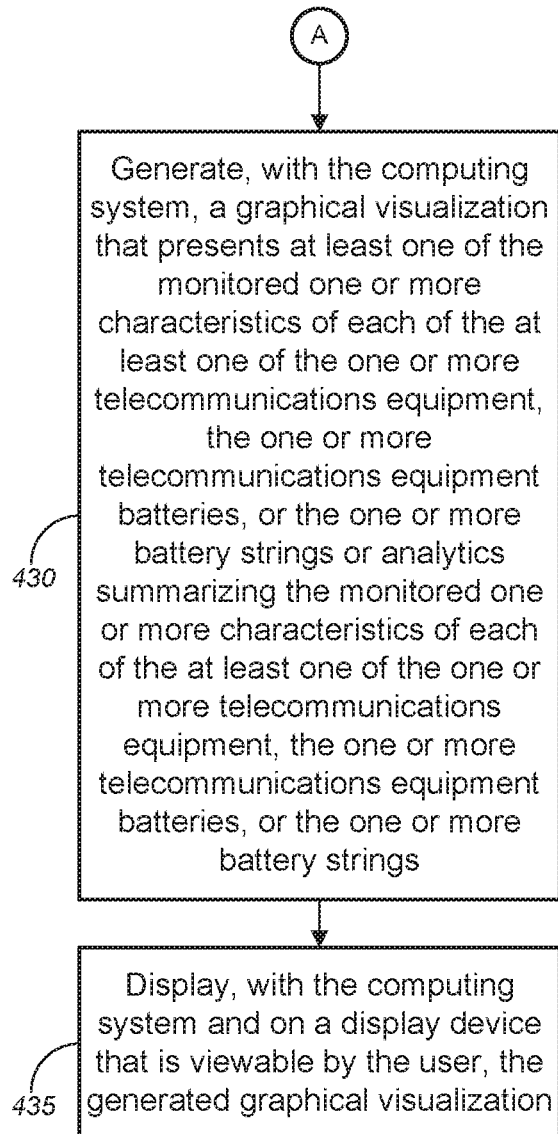

At block 430 in FIG. 4B (following the circular marker denoted, "A"), method 400 might comprise generating, with the computing system of the telecommunications equipment health monitoring and management system, a graphical visualization that presents at least one of the monitored one or more characteristics of each of the at least one of the one or more telecommunications equipment, the one or more telecommunications equipment batteries, or the one or more battery strings, and/or the like or analytics summarizing the monitored one or more characteristics of each of the at least one of the one or more telecommunications equipment, the one or more telecommunications equipment batteries, or the one or more battery strings, and/or the like. Method 400 might further comprise displaying, with the computing system and on a display device that is viewable by the user, the generated graphical visualization (such as, but not limited to, that shown in FIG. 3, or the like).

Figures 4C, 4D:
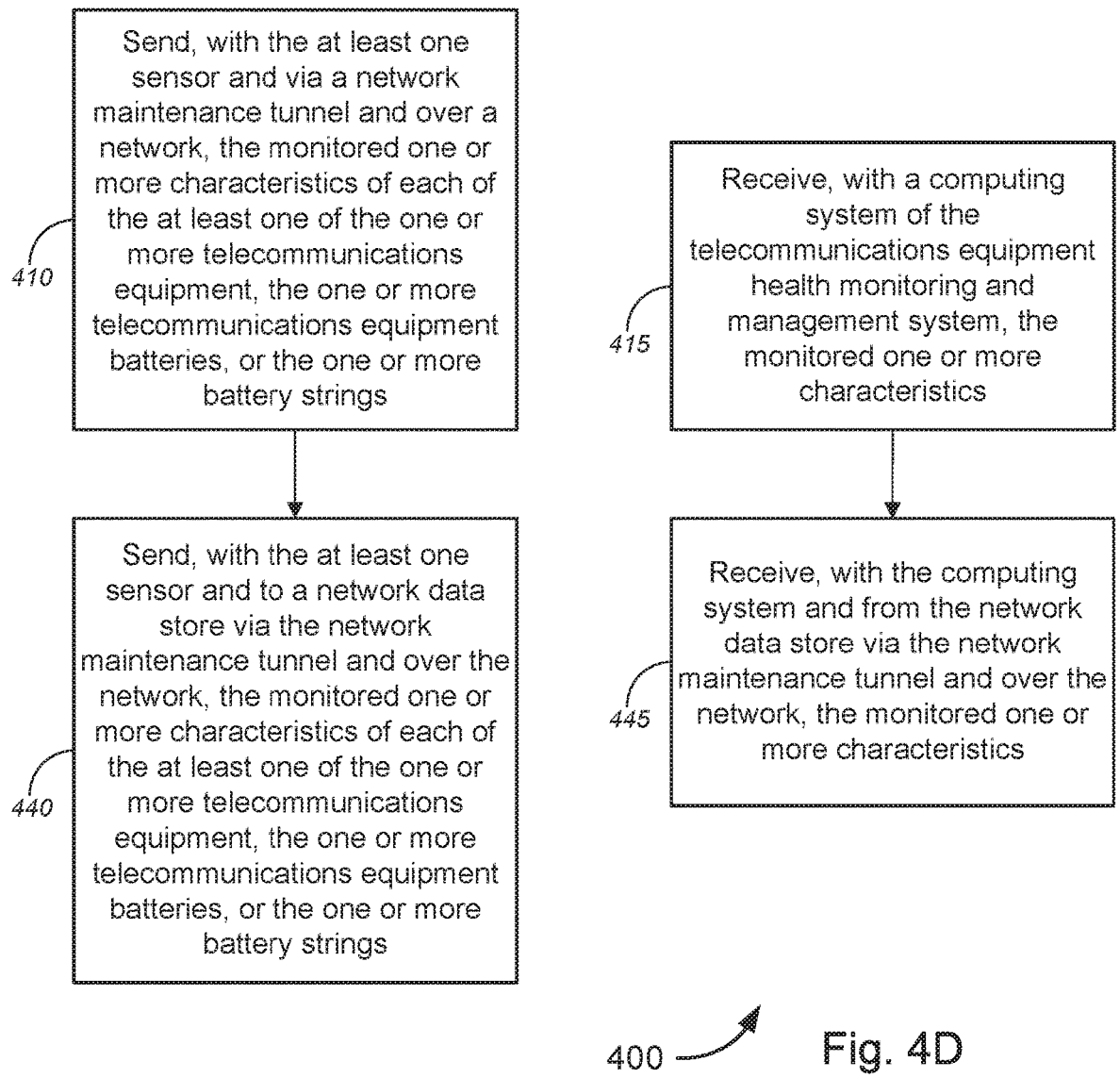

Referring to FIGS. 4C and 4D, the monitored one or more characteristics of each of the at least one of the one or more telecommunications equipment, the one or more telecommunications equipment batteries, or the one or more battery strings, and/or the like, may be stored in a network data store or the like (e.g., an analytics-based data store such as Splunk®, Tableau®, or the like). According to such embodiments, sending the monitored one or more characteristics of each of the at least one of the one or more telecommunications equipment, the one or more telecommunications equipment batteries, or the one or more battery strings, and/or the like, via the network maintenance tunnel and over the network (at block 410) might comprise sending, with the at least one sensor of the telecommunications equipment health monitoring and management system and to the network data store via the network maintenance tunnel and over the network, the monitored one or more characteristics of each of the at least one of the one or more telecommunications equipment, the one or more telecommunications equipment batteries, or the one or more battery strings, and/or the like (block 440). In a similar manner, with reference to FIG. 4D, in some embodiments, receiving, with the computing system of the telecommunications equipment health monitoring and management system, the monitored one or more characteristics of each of the at least one of the one or more telecommunications equipment, the one or more telecommunications equipment batteries, or the one or more battery strings, and/or the like (at block 415) might comprise receiving, with the computing system of the telecommunications equipment health monitoring and management system and from the network data store via the network maintenance tunnel and over the network, the monitored one or more characteristics of each of the at least one of the one or more telecommunications equipment, the one or more telecommunications equipment batteries, or the one or more battery strings, and/or the like (block 445).

Exemplary System and Hardware Implementation

Figure 5:
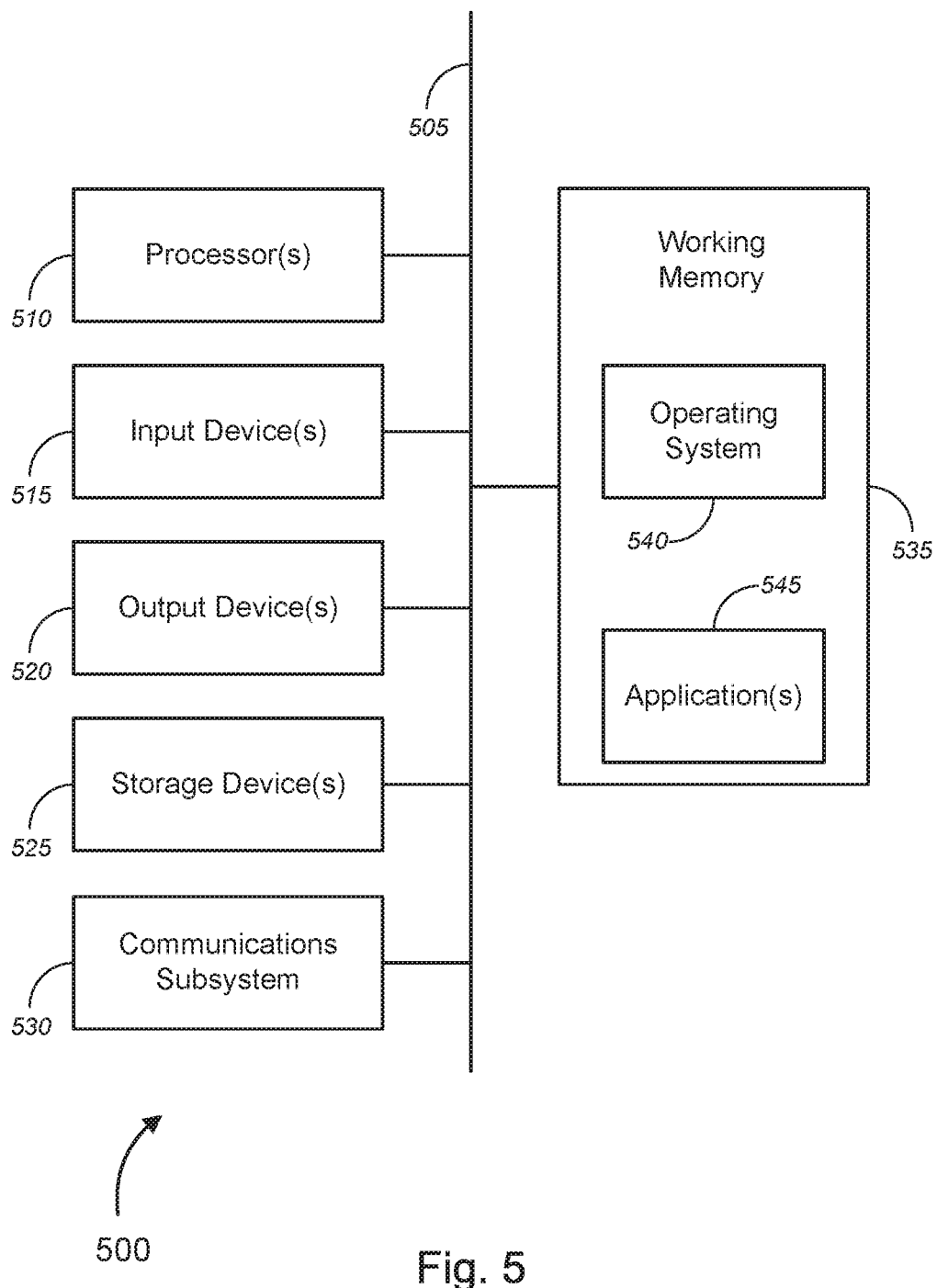
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105*a* and 105*b*, user device(s) 115, display devices 120 and 305, telecommunications equipment 135*a*-135*n* and 225, and sensors 150, 155, 180, 185, 235, and 240, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105*a* and 105*b*, user device(s) 115, display devices 120 and 305, telecommunications equipment 135*a*-135*n* and 225, and sensors 150, 155, 180, 185, 235, and 240, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
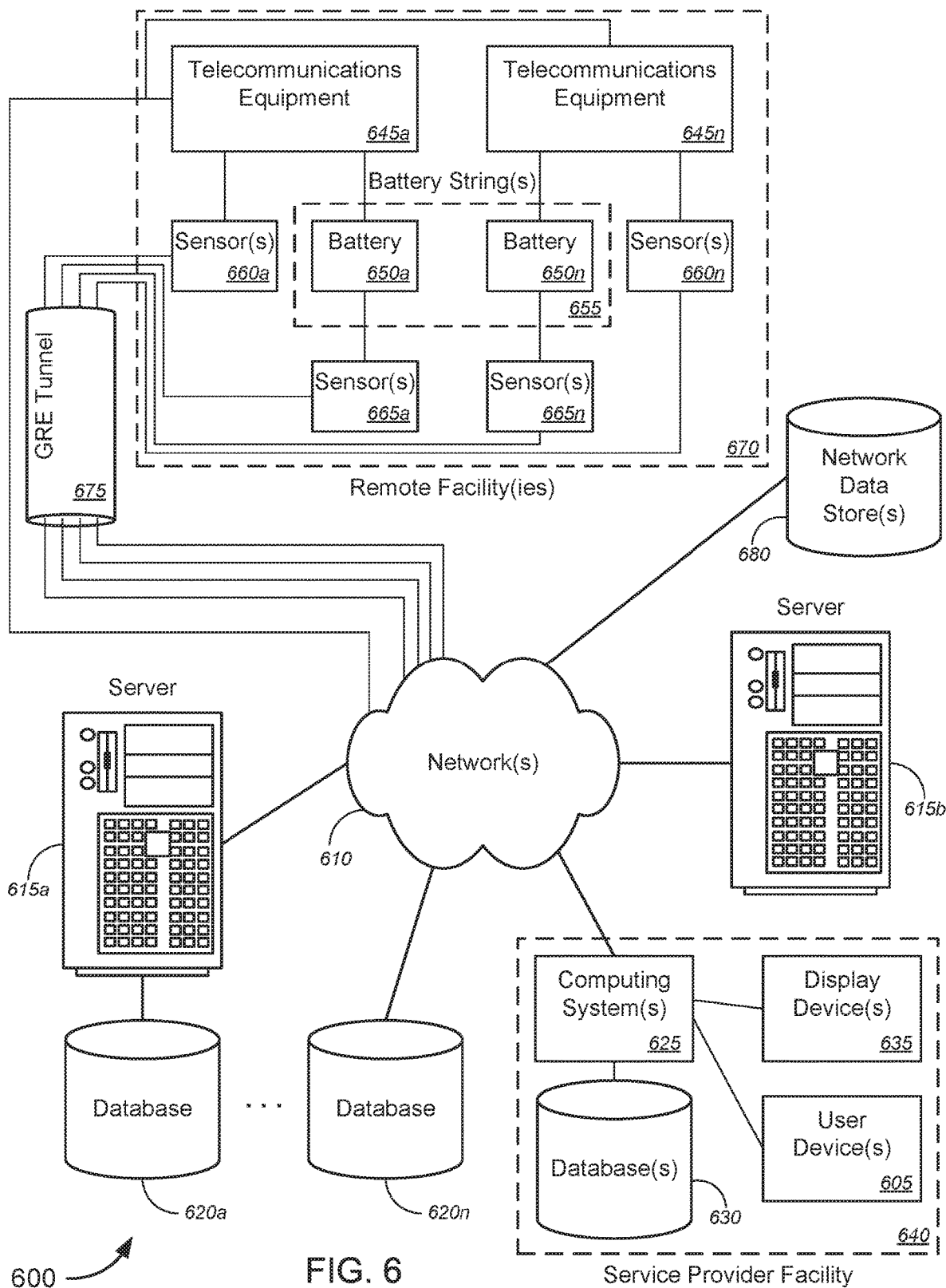
FIG. 6 is a block diagram illustrating a networked system of computers, computing systems, or system hardware architecture, which can be used in accordance with various embodiments.

As noted above, a set of embodiments comprises methods and systems for implementing communications with telecommunications equipment, and, more particularly, to methods, systems, and apparatuses for implementing telecommunications equipment health monitoring and management. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with one user computer, user device, or customer device 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 165 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing communications with telecommunications equipment, and, more particularly, to methods, systems, and apparatuses for implementing telecommunications equipment health monitoring and management, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system(s) 625 and corresponding database(s) 630 (similar to computing system(s) 105a or 105b and corresponding database(s) 110a or 110b, respectively, of FIG. 1, or the like). System 600 might further comprise display device(s) 635 (similar to display device(s) 120 or 305 of FIGS. 1 and 3, or the like). Computing system(s) 625 might be communicatively coupled to each of database(s) 630, user device(s) 605 (similar to user device(s) 115 of FIG. 1, or the like), and/or display device(s) 635, while also being communicatively coupled to network(s) 610. User device(s) 605, computing system(s) 625, database(s) 630, and/or display device(s) may be disposed at service provider facility 640 (which might include, but is not limited to, a central office ("CO"), a service operations headquarters, and/or the like) that is associated with, or operated by, a service provider.

System 600 might further comprise one or more telecommunications equipment 645a-645n (collectively, "telecommunications equipment 645" or the like; similar to telecommunications equipment 135a-135n and 225 of FIGS. 1 and 2, or the like), one or more batteries 650a-650n (collectively, "batteries 650" or the like; similar to batteries 140a-140n and 205 of FIGS. 1 and 2, or the like), a battery string(s) 655 (similar to battery string(s) 145 and 210 of FIGS. 1 and 2, or the like), first sensor(s) 660a-660n (collectively, "first sensors 660" or "sensors 660" or the like; similar to sensors 150, 180, 185, and 235 of FIGS. 1 and 2, or the like), and second sensor(s) 665*a*-665*n* (collectively, "second sensors 665" or "sensors 665" or the like; similar to sensors 155, 180, 185, and 240 of FIGS. 1 and 2, or the like), and/or the like, each of which may be disposed at a remote facility(ies) 670, which may be associated with, or operated by, the service provider. The remote facility(ies) 670 might each include, but is not limited to, a central office, a remote cabinet, or a digital subscriber line access multiplexer ("DSLAM"), and/or the like. System 600 might further comprise a network maintenance tunnel 675 (similar to network maintenance tunnel 170 and 245 of FIGS. 1 and 2, or the like) and a network data store(s) 680 (e.g., an analytics-based data store such as Splunk®, Tableau®, or the like; similar to network data store(s) 175 of FIG. 1, or the like). The telecommunications equipment 645 might communicatively couple to the server(s) 615*a* or 615*b* or to computing system(s) 625 via network(s) 610 and via regular network routes or pathways, while the sensors 660 and 665 might communicatively couple to the server(s) 615*a* or 615*b* or to computing system(s) 625 via network(s) 610 and via the network maintenance tunnel 675. According to some embodiments, the network maintenance tunnel 675 might include, but is not limited to, one of a generic routing encapsulation ("GRE") tunnel, a business support systems ("BSS") communications line, an operations support systems ("OSS") communications line, or a virtual private network ("VPN") communications connection, or the like. In some cases, the network maintenance tunnel 675 might be a communications tunnel that transfers data over the network(s) 610 without utilizing bandwidth associated with customers of a service provider operating the network(s) 610.

In some instances, the telecommunications equipment 645 might include, without limitation, at least one of one or more analog switches, one or more digital switches, one or more voice over Internet protocol ("VoIP") switches, one or more multilayer switches, one or more protocol converters, one or more base transceiver stations, one or more multiplexers, one or more customer office terminals, one or more modems, one or more routers, one or more network nodes, one or more gateway devices, one or more bridges, one or more bridge routers, one or more repeaters, one or more repeater hubs, one or more proxy servers, one or more firewalls, one or more network address translators, one or more network interface controllers, one or more wireless network interface controllers, one or more terminal adapters (e.g., integrated services digital network ("ISDN") terminal adapters, or the like), one or more line drivers, and/or the like.

In some embodiments, the sensors 660 might be coupled to the telecommunications equipment 645, as individual sensors or as sets of sensors, and might each include, without limitation, at least one of a voltmeter, an ammeter, a multimeter, a thermometer, a humidity sensor, a gas discharge sensor, network connectivity sensor, or network communications sensor, and/or the like. In a similar manner, the sensors 665 might be coupled to the batteries 650 and/or the battery string(s) 655 providing power to the telecommunications equipment 645, as individual sensors or as sets of sensors, and might each include, but is not limited to, at least one of a voltmeter, an ammeter, a multimeter, a thermometer, a humidity sensor, a gas discharge sensor, network connectivity sensor, or network communications sensor, and/or the like.

In operation, at least one sensor among the sensors 660 and/or sensors 665 might monitor one or more characteristics of each of at least one of one or more telecommunications equipment 645 in a remote facility 670, one or more telecommunications equipment batteries 650 within a battery string 655 providing power to telecommunications equipment 645 in a remote facility 670, or one or more battery strings 655 providing power to telecommunications equipment 645 in a remote facility 670, and/or the like. The at least one sensor might send the monitored one or more characteristics of each of the at least one of the one or more telecommunications equipment 645, the one or more telecommunications equipment batteries 650, or the one or more battery strings 655, via network maintenance tunnel 675 (e.g., a GRE tunnel, a BSS communications line, an OSS communications line, or a VPN communications connection, or the like), in some cases to network data store(s) 680. Computing system(s) 625 might subsequently receive the monitored one or more characteristics of each of the at least one of the one or more telecommunications equipment 645, the one or more telecommunications equipment batteries 650, or the one or more battery strings 655, in some cases from network data store(s) 680, over the network(s) 610 (in some instances, via network maintenance tunnel 675 (not shown in FIG. 6)).

Computing system(s) 625 might analyze the monitored one or more characteristics of each of the at least one of the one or more telecommunications equipment 645, the one or more telecommunications equipment batteries 650, or the one or more battery strings 655 to identify each telecommunications equipment, each telecommunications equipment battery, or each battery string having equipment health issues. Based on a determination that one or more of at least one telecommunications equipment, at least one telecommunications equipment battery, or at least one battery string have equipment health issues, computing system(s) 625 might send a notification to a user (e.g., by sending the notification to user device(s) 605, or the like), the notification comprising information regarding the one or more of the at least one telecommunications equipment, the at least one telecommunications equipment battery, or the at least one battery string having equipment health issues, and/or the like.

In some cases, the one or more characteristics of each of the at least one of the one or more telecommunications equipment 645, the one or more telecommunications equipment batteries 650, or the one or more battery strings 655 might include, without limitation, at least one of voltage, amperage, electrical charge, temperature, humidity, gas discharge, network connectivity, or network communications characteristics, and/or the like. In some instances, the equipment health issues might include, but are not limited to, at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues, and/or the like.

According to some embodiments, computing system(s) 625 might generate a graphical visualization that presents at least one of the monitored one or more characteristics of each of the at least one of the one or more telecommunications equipment 645, the one or more telecommunications equipment batteries 650, or the one or more battery strings 655 or analytics summarizing the monitored one or more characteristics of each of the at least one of the one or more telecommunications equipment 645, the one or more telecommunications equipment batteries 650, or the one or more battery strings 655, and/or the like. The computing system(s)

625 might subsequently display, on a display device (e.g., display device(s) 635) that is viewable by the user, the generated graphical visualization.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
monitoring, with at least one sensor of a telecommunications equipment health monitoring and management system, one or more characteristics of each of at least one of one or more telecommunications equipment in a central office, a remote cabinet, or a digital subscriber line access multiplexer ("DSLAM"), one or more telecommunications equipment batteries within a battery string providing power to telecommunications equipment in a central office, a remote cabinet, or a DSLAM, or one or more battery strings providing power to telecommunications equipment in a central office, a remote cabinet, or a DSLAM;
sending, with the at least one sensor of the telecommunications equipment health monitoring and management system and via a network maintenance tunnel and over a network, the monitored one or more characteristics of each of the at least one of the one or more telecommunications equipment, the one or more telecommunications equipment batteries, or the one or more battery strings;
receiving, with a computing system of the telecommunications equipment health monitoring and management system, the monitored one or more characteristics of each of the at least one of the one or more telecommunications equipment, the one or more telecommunications equipment batteries, or the one or more battery strings;
analyzing, with the computing system of the telecommunications equipment health monitoring and management system, the monitored one or more characteristics of each of the at least one of the one or more telecommunications equipment, the one or more telecommunications equipment batteries, or the one or more battery strings to identify each telecommunications equipment, each telecommunications equipment battery, or each battery string having equipment health issues;
based on a determination that one or more of at least one telecommunications equipment, at least one telecommunications equipment battery, or at least one battery string have equipment health issues, sending, with the computing system, a notification to a user, the notification comprising information regarding the one or more of the at least one telecommunications equipment, the at least one telecommunications equipment battery, or the at least one battery string having equipment health issues;
generating, with the computing system of the telecommunications equipment health monitoring and management system, a graphical visualization that presents at least one of the monitored one or more characteristics of each of the at least one of the one or more telecommunications equipment, the one or more telecommunications equipment batteries, or the one or more battery strings or analytics summarizing the monitored one or more characteristics of each of the at least one of the one or more telecommunications equipment, the one or more telecommunications equipment batteries, or the one or more battery strings, wherein the graphical visualization includes a map and each of the at least one of the monitored one or more characteristics are presented at an associated geographic location on the map, and wherein at least two characteristics are presented at an associated geographic location with accompanying icons for at least one of the one or more telecommunications equipment, the one or more telecommunications equipment batteries, or the one or more battery strings; and
displaying, with the computing system and on a display device that is viewable by the user, the generated graphical visualization, wherein
the network maintenance tunnel comprises one of a generic routing encapsulation ("GRE") tunnel, a business support systems ("BSS") communications line, an operations support systems ("OSS") communications line, or a virtual private network ("VPN") communications connection, and
the network maintenance tunnel is a communications tunnel that transfers data over the network without utilizing bandwidth associated with customers of a service provider operating the network.

2. The method of claim 1, wherein the at least one sensor is coupled to each equipment, battery, or battery string among the at least one of the one or more telecommunications equipment, the one or more telecommunications equipment batteries, or the one or more battery strings.

3. The method of claim 1, wherein the at least one sensor each comprises at least one of a voltmeter, an ammeter, a multimeter, a thermometer, a humidity sensor, a gas discharge sensor, network connectivity sensor, or network communications sensor.

4. The method of claim 1, wherein the one or more characteristics of each of the at least one of the one or more telecommunications equipment, the one or more telecommunications equipment batteries, or the one or more battery strings comprise at least one of voltage, amperage, electrical charge, temperature, humidity, gas discharge, network connectivity, or network communications characteristics.

5. The method of claim 1, wherein the equipment health issues comprise at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues.

6. The method of claim 1, wherein sending the monitored one or more characteristics of each of the at least one of the one or more telecommunications equipment, the one or more telecommunications equipment batteries, or the one or more battery strings via the network maintenance tunnel and over the network comprises sending, with the at least one sensor of the telecommunications equipment health monitoring and management system and to a network data store via the network maintenance tunnel and over the network, the monitored one or more characteristics of each of the at least one of the one or more telecommunications equipment, the one or more telecommunications equipment batteries, or the one or more battery strings.

7. The method of claim 6, wherein receiving, with the computing system of the telecommunications equipment health monitoring and management system, the monitored one or more characteristics of each of the at least one of the one or more telecommunications equipment, the one or more telecommunications equipment batteries, or the one or more battery strings comprises receiving, with the computing system of the telecommunications equipment health monitoring and management system and from the network data store, the monitored one or more characteristics of each of the at least one of the one or more telecommunications equipment, the one or more telecommunications equipment batteries, or the one or more battery strings.

8. A telecommunications equipment health monitoring and management system, comprising:
   at least one sensor disposed at one of a central office, a remote cabinet, or a digital subscriber line access multiplexer ("DSLAM"), wherein the at least one sensor monitors one or more characteristics of each of at least one of one or more telecommunications equipment in the one of the central office, the remote cabinet, or the DSLAM, one or more telecommunications equipment batteries within a battery string providing power to telecommunications equipment in the one of the central office, the remote cabinet, or the DSLAM, or one or more battery strings providing power to telecommunications equipment in the one of the central office, the remote cabinet, or the DSLAM, wherein the at least one sensor sends the monitored one or more characteristics of each of the at least one of the one or more telecommunications equipment, the one or more telecommunications equipment batteries, or the one or more battery strings via a network maintenance tunnel and over a network;
   a computing system that communicatively couples to the at least one sensor via a network maintenance tunnel and over a network, the computing system comprising:
   at least one processor; and
   a non-transitory computer readable medium communicatively coupled to the at least one processor, the non-transitory computer readable medium having stored thereon computer software comprising a set of instructions that, when executed by the at least one processor, causes the computing system to:
   receive the monitored one or more characteristics of each of the at least one of the one or more telecommunications equipment, the one or more telecommunications equipment batteries, or the one or more battery strings;
   analyze the monitored one or more characteristics of each of the at least one of the one or more telecommunications equipment, the one or more telecommunications equipment batteries, or the one or more battery strings to identify each telecommunications equipment, each telecommunications equipment battery, or each battery string having equipment health issues;
   based on a determination that one or more of at least one telecommunications equipment, at least one telecommunications equipment battery, or at least one battery string have equipment health issues, send a notification to a user, the notification comprising information regarding the one or more of the at least one telecommunications equipment, the at least one telecommunications equipment battery, or the at least one battery string having equipment health issues;
   generate a graphical visualization that presents at least one of the monitored one or more characteristics of each of the at least one of the one or more telecommunications equipment, the one or more telecommunications equipment batteries, or the one or more battery strings or analytics summarizing the monitored one or more characteristics of each of the at least one of the one or more telecommunications equipment, the one or more telecommunications equipment batteries, or the one or more battery strings, wherein the graphical visualization includes a map and each of the at least one of the monitored one or more characteristics are presented at an associated geographic location on the map, and wherein at least two characteristics are presented at an associated geographic location with accompanying icons for at least one of the one or more telecommunications equipment, the one or more telecommunications equipment batteries, or the one or more battery strings; and
   display, on a display device that is viewable by the user, the generated graphical visualization, wherein
   the network maintenance tunnel comprises one of a generic routing encapsulation ("GRE") tunnel, a business support systems ("BSS") communications line, an operations support systems ("OSS") communications line, or a virtual private network ("VPN") communications connection, and
   the network maintenance tunnel is a communications tunnel that transfers data over the network without utilizing bandwidth associated with customers of a service provider operating the network.

9. The telecommunications equipment health monitoring and management system of claim 8, wherein the at least one sensor is coupled to each equipment, battery, or battery string among the at least one of the one or more telecommunications equipment, the one or more telecommunications equipment batteries, or the one or more battery strings.

10. The telecommunications equipment health monitoring and management system of claim 8, wherein the at least one sensor each comprises at least one of a voltmeter, an ammeter, a multimeter, a thermometer, a humidity sensor, a gas discharge sensor, network connectivity sensor, or network communications sensor.

11. The telecommunications equipment health monitoring and management system of claim 8, wherein the one or more characteristics of each of the at least one of the one or more telecommunications equipment, the one or more telecommunications equipment batteries, or the one or more battery strings comprise at least one of voltage, amperage, electrical charge, temperature, humidity, gas discharge, network connectivity, or network communications characteristics.

12. The telecommunications equipment health monitoring and management system of claim 8, wherein the equipment health issues comprise at least one of high temperature above predetermined high temperature thresholds, low temperature below predetermined low temperature thresholds, high humidity above predetermined high humidity thresholds, battery gas leakage, abnormal battery charge rate, abnormal battery drain rate, dead battery, network connectivity issues, or network communications issues.

13. The telecommunications equipment health monitoring and management system of claim 8, wherein sending the monitored one or more characteristics of each of the at least one of the one or more telecommunications equipment, the one or more telecommunications equipment batteries, or the one or more battery strings via the network maintenance tunnel and over the network comprises sending, with the at least one sensor of the telecommunications equipment health monitoring and management system and to a network data store via the network maintenance tunnel and over the network, the monitored one or more characteristics of each of the at least one of the one or more telecommunications equipment, the one or more telecommunications equipment batteries, or the one or more battery strings.

14. The telecommunications equipment health monitoring and management system of claim 13, wherein receiving the monitored one or more characteristics of each of the at least one of the one or more telecommunications equipment, the one or more telecommunications equipment batteries, or the one or more battery strings comprises receiving, with the computing system of the telecommunications equipment health monitoring and management system and from the network data store via the network maintenance tunnel and over the network, the monitored one or more characteristics of each of the at least one of the one or more telecommunications equipment, the one or more telecommunications equipment batteries, or the one or more battery strings.

* * * * *